US010884692B2

(12) United States Patent
Kim et al.

(10) Patent No.: US 10,884,692 B2
(45) Date of Patent: Jan. 5, 2021

(54) ELECTRONIC DEVICE AND METHOD FOR DISPLAYING AND TRANSMITTING IMAGES THEREOF

(71) Applicant: Samsung Electronics Co., Ltd., Suwon-si (KR)

(72) Inventors: Hyeongtae Kim, Hwaseong-si (KR); Changtae Kim, Suwon-si (KR); Taekun Kim, Incheon (KR); Donghun Park, Hwaseong-si (KR); Jaewoong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 15/441,986

(22) Filed: Feb. 24, 2017

(65) Prior Publication Data
US 2017/0255442 A1 Sep. 7, 2017

(30) Foreign Application Priority Data
Mar. 2, 2016 (KR) .................... 10-2016-0024977

(51) Int. Cl.
*G06F 3/14* (2006.01)
*G06F 1/16* (2006.01)
(Continued)

(52) U.S. Cl.
CPC ............ *G06F 3/1454* (2013.01); *G06F 1/165* (2013.01); *G06F 1/1616* (2013.01);
(Continued)

(58) Field of Classification Search
CPC .... G06F 3/1454; G06F 1/1641; G06F 1/1647; G06F 1/165; G06F 1/1652;
(Continued)

(56) References Cited

U.S. PATENT DOCUMENTS

| 8,458,370 B1* | 6/2013 | Tsu ................... G09G 5/006 370/465 |
| 2011/0181492 A1* | 7/2011 | Soeda .................. G06F 3/1454 345/1.1 |

(Continued)

FOREIGN PATENT DOCUMENTS

| KR | 10-2014-0074141 A | 6/2014 |
| KR | 10-2015-0026773 A | 3/2015 |

(Continued)

OTHER PUBLICATIONS

European Search Report dated Dec. 13, 2018; Reference #: P6077219PCT/EP; Application #/Patent #: 17760305.7-1221/3408736 PCT/KR2017002227.

*Primary Examiner* — Kent W Chang
*Assistant Examiner* — Sujit Shah
(74) *Attorney, Agent, or Firm* — Jefferson IP Law, LLP

(57) ABSTRACT

A method for displaying and transmitting images and an electronic device thereof are provided. The electronic device includes a first display, a second display separated from the first display, a transceiver, at least one processor electrically connected to the first display, the second display, and the transceiver, and a memory electrically connected to the at least one processor. The at least one processor is configured to display a first screen image on the first display, provide a second screen image on the second display at least partially simultaneously with the displaying of the first screen image on the first display, provide data associated with one of the screen images to the transceiver, and control the transceiver to transmit the data to an external device such that a screen image at least partially identical to one of the screen images is output on a display of the external device.

15 Claims, 22 Drawing Sheets

(51) Int. Cl.
*H04M 1/725* (2006.01)
*G06F 3/0488* (2013.01)

(52) U.S. Cl.
CPC .......... *G06F 1/1626* (2013.01); *G06F 1/1641* (2013.01); *G06F 1/1647* (2013.01); *G06F 1/1652* (2013.01); *G06F 3/04883* (2013.01); *H04M 1/7253* (2013.01); *H04M 1/72583* (2013.01); *G06F 3/1423* (2013.01); *G09G 2370/16* (2013.01); *H04M 1/72527* (2013.01)

(58) Field of Classification Search
CPC .............. G06F 3/04883; G06G 1/1616; G06G 1/1626; H04M 1/7253
See application file for complete search history.

(56) References Cited

U.S. PATENT DOCUMENTS

| | | | | |
|---|---|---|---|---|
| 2011/0230178 A1* | 9/2011 | Jones | ................... | H04M 1/0235 455/422.1 |
| 2011/0239142 A1* | 9/2011 | Steeves | ..................... | G06F 3/14 715/764 |
| 2011/0314173 A1* | 12/2011 | Lyu | ....................... | H04L 65/605 709/231 |
| 2013/0027289 A1 | 1/2013 | Choi et al. | | |
| 2013/0210488 A1* | 8/2013 | Lee | ......................... | G06F 9/452 455/557 |
| 2013/0328878 A1* | 12/2013 | Stahl | ..................... | G06F 3/1431 345/428 |
| 2014/0068519 A1* | 3/2014 | Nam | ............... | H04M 1/274533 715/838 |
| 2014/0132543 A1* | 5/2014 | Kim | ..................... | G06F 1/1626 345/173 |
| 2014/0164941 A1 | 6/2014 | Kim et al. | | |
| 2014/0359454 A1* | 12/2014 | Lee | ......................... | G06F 3/0488 715/734 |
| 2014/0359493 A1 | 12/2014 | Hong et al. | | |
| 2014/0365611 A1 | 12/2014 | Praveenkumar et al. | | |
| 2014/0378183 A1* | 12/2014 | Xiong | ................ | H04M 1/72522 455/556.1 |
| 2015/0061968 A1 | 3/2015 | Park et al. | | |
| 2015/0082184 A1 | 3/2015 | Kim et al. | | |
| 2015/0160913 A1 | 6/2015 | Lee | | |
| 2015/0199125 A1* | 7/2015 | Tsukamoto | ......... | G06F 3/04883 715/765 |
| 2015/0293741 A1* | 10/2015 | Glazer | ................. | G06F 3/1454 345/2.3 |
| 2015/0325216 A1* | 11/2015 | Park | ......................... | G06F 1/16 345/634 |
| 2016/0054896 A1* | 2/2016 | Takahashi | ........... | G06F 3/04842 715/810 |

FOREIGN PATENT DOCUMENTS

KR  10-1525882 B1  6/2015
KR  10-2015-0129386 A  11/2015

* cited by examiner

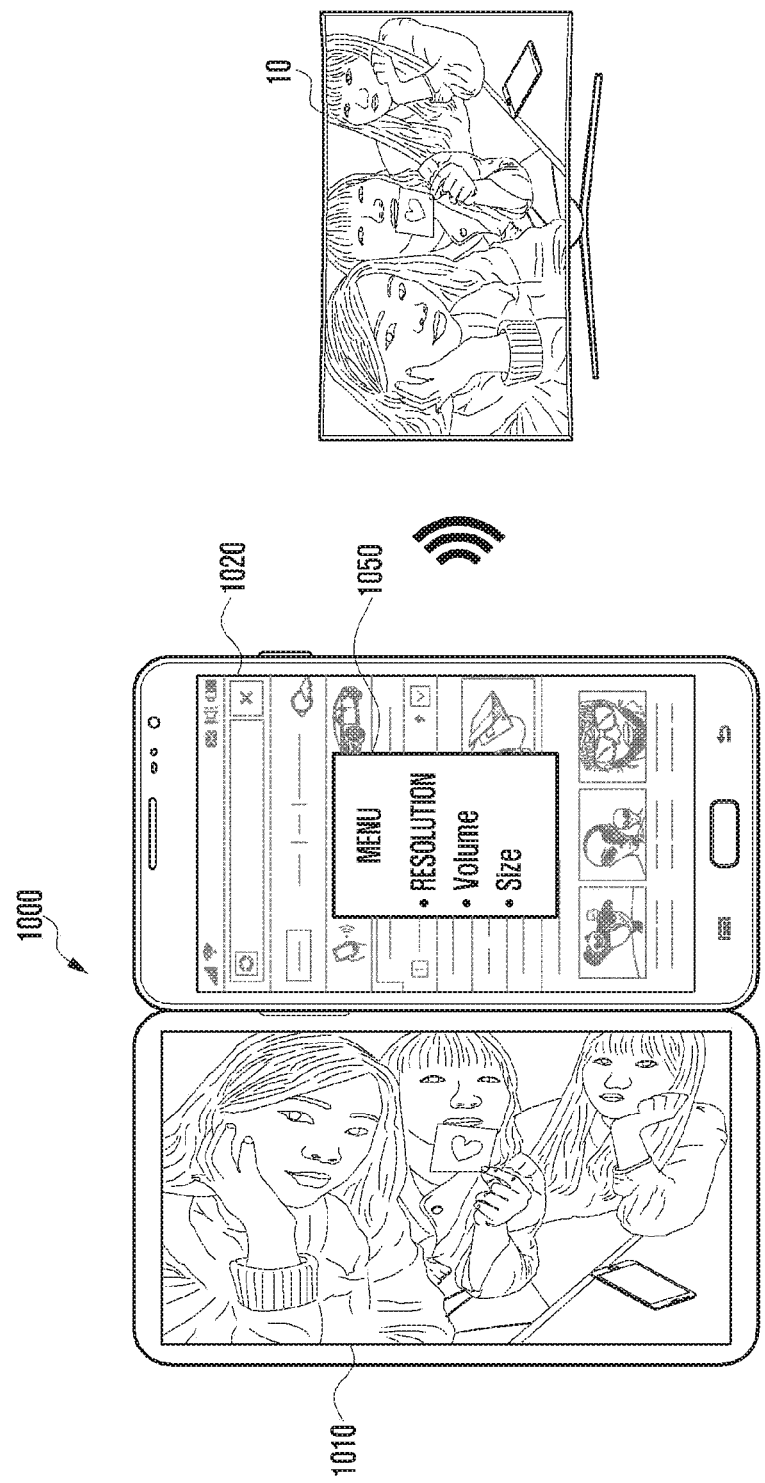

ELECTRONIC DEVICE AND METHOD FOR DISPLAYING AND TRANSMITTING IMAGES THEREOF

CROSS-REFERENCE TO RELATED APPLICATION(S)

This application claims the benefit under 35 U.S.C. § 119(a) of a Korean patent application filed on Mar. 2, 2016 in the Korean Intellectual Property Office and assigned Serial number 10-2016-0024977, the entire disclosure of which is hereby incorporated by reference.

TECHNICAL FIELD

The present disclosure relates to an electronic device. More particularly, the present disclosure relates to a technology that enables an electronic device to display an image and transmit the displayed image to an external device.

BACKGROUND

With advances in mobile communication and processor technologies, electronic devices such as mobile terminals and smartphones can support not only conventional call functions but also various advanced functions. Such an electronic device may be equipped with a display including a touch panel to output images generated by various functions. The electronic device may output images associated with various applications, web browsers, and video content on the display.

An electronic device may exchange various data with an external device through various wired or wireless communication schemes. In particular, the image displayed on the electronic device may also be displayed on the external device by use of a mirroring technology. The mirroring technology enables multiple electronic devices each having a display to share screen data. The image output on the display of an electronic device may be sent to an external device in peer-to-peer (P2P) mode through wireless local area communication like Wi-Fi, and the external device may display the received image at the same time as the electronic device. As such, the mirroring technology may be very effective for a user who wishes to view images that are created by an electronic device with a small display by use of an external device with a large display.

However, the existing mirroring technology, which transmits the image output on the display of the electronic device to the external device as it is, may not be suitable for achieving multitasking. For example, while the user is viewing video content using the external device, when a popup window for a social networking service (SNS) message is output on the electronic device, the popup window may also be output on the display of the external device. Output of the popup window on the external device would not be in accord with the intent of the user wishing to view video content on a larger screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide an electronic device that can not only share at least a portion of the image output on the display with an external device but also handle a different action on the display in a multitasking fashion.

In accordance with an aspect of the present disclosure, an electronic device is provided. The electronic device may include a housing, a first display positioned on a first portion of the housing, a second display positioned on a second portion of the housing, the second display separated from the first display, a communication circuit positioned inside the housing, a transceiver positioned inside the housing and electrically connected to the first display, the second display, and the transceiver, and a memory positioned inside the housing and electrically connected to the at least one processor. The memory may store instructions that, when executed by the at least one processor, cause the at least one processor to display a first screen image on the first display, display a second screen image on the second display at least partially simultaneously with the displaying of the first screen image on the first display, provide data associated with one of the first screen image and the second screen image to the transceiver, and control the transceiver to transmit the data to an external device having a display such that a screen image at least partially identical to one of the first screen image and the second screen image is output on the display of the external device.

In accordance with another aspect of the present disclosure, an electronic device is provided. The electronic device includes a housing, a first display positioned on a first portion of the housing, a second display positioned on a second portion of the housing, the second display separated from the first display, a transceiver positioned inside the housing, at least one processor positioned inside the housing and electrically connected to the first display, the second display, and the transceiver, and a memory positioned inside the housing and electrically connected to the at least one processor. The memory may store instructions that, when executed by the at least one processor, cause the at least one processor to display a first screen image on the first display, display a second screen image on the second display at least partially simultaneously with the displaying of the first screen image, provide data associated with a third screen image to the transceiver at least partially simultaneously with the displaying of the first screen image and the second screen image, and control the transceiver to transmit the data to an external device having a display such that the third screen image is output on the display of the external device.

In accordance with another aspect of the present disclosure, an electronic device is provided. The electronic device includes a housing, a display positioned inside the housing, a transceiver positioned inside the housing, at least one processor positioned inside the housing and electrically connected to the display and the transceiver, and a memory positioned inside the housing and electrically connected to the at least one processor. The memory may store instructions that, when executed by the at least one processor, cause the at least one processor to display a first screen image on a first area of the display, display a second screen image on a second area of the display at least partially different from the first area at least partially simultaneously with the displaying of the first screen image, provide data associated with one of the first screen image and the second screen image to the transceiver at least partially simultaneously with the displaying of the first screen image and the second screen image, and control the transceiver to transmit the data to an external device having a display such that a screen image at least partially identical to one of the first screen image and the second screen image is output on the display of the external device.

In accordance with another aspect of the present disclosure, a method of image display and transmission for an electronic device is provided. The method includes displaying a first screen image on a first display, displaying a second screen image on a second display at least partially simultaneously with the displaying of the first screen image, and transmitting data associated with one of the first screen image and the second image to an external device having a display such that a screen image at least partially identical to one of the first screen image and the second screen image is output on the display of the external device, wherein the second display is separated from the first display.

In a feature of the present disclosure, an electronic device is provided that can not only share at least a portion of the image output on the display with an external device but also handle a different action on the display in a multitasking fashion. There is also provided a method of displaying and transmitting images, enabling the electronic device to perform image sharing and another action in a multitasking fashion.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A, 10B, and 10C illustrate operations for handling various events occurring while image sharing is in progress according to various embodiments of the present;

Throughout the drawings, like reference numerals will be understood to refer to like parts, components, and structures.

DETAILED DESCRIPTION

Figure 1:
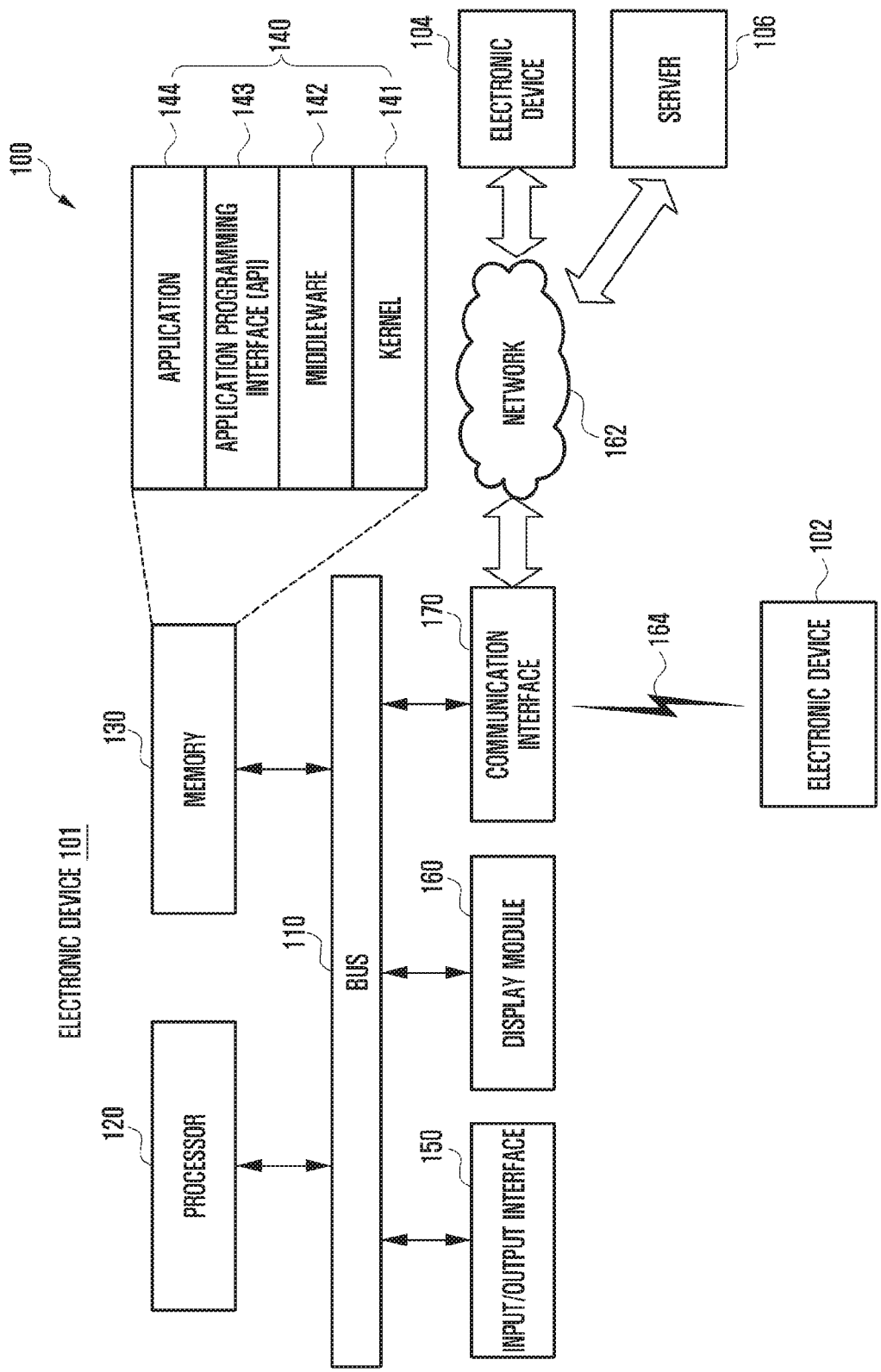
FIG. 1 illustrates a network environment including electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an Moving Picture Experts Group phase 1 or phase 2 (MPEG-1 or MPEG-2) audio layer 3 (MP3) player, a portable medical device, a digital camera, or a wearable device (e.g., an head-mounted device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a television (TV), a digital versatile disc (DVD)) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are various only and not to be considered as a limitation of this disclosure.

FIG. 1 is a block diagram illustrating an electronic apparatus according to an embodiment of the present disclosure.

Referring to FIG. 1, the electronic device 101 may include a bus 110, a processor 120, a memory 130, a user input module 150, a display or display module 160, and a communication interface 170 (e.g. a transceiver).

The bus 110 may be a circuit for interconnecting elements described above and for allowing a communication, e.g. by transferring a control message, between the elements described above.

The processor 120 (e.g. at least one processor) can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 142, an application programming interface (API) 143, and an application 144. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 142, the API 143, and/or the application 144. Further, the kernel 141 can provide an interface through which the middleware 142, the API 143, and/or the application 144 can access and then control and/or manage an individual element of the electronic apparatus 101.

The middleware 142 can perform a relay function which allows the API 143 and/or the application 144 to communicate with and exchange data with the kernel 141. Further, in relation to operation requests received from at least one of an application 144, the middleware 142 can perform load balancing in relation to the operation requests by, for example, giving a priority in using a system resource, e.g. the bus 110, the processor 120, and/or the memory 130, of the electronic device 101 to at least one application from among the at least one of the application 144.

The API 143 is an interface through which the application 144 can control a function provided by the kernel 141 and/or the middleware 142, and may include, for example, at least one interface or function for file control, window control, image processing, and/or character control.

The user input module 150 (or input/output interface) can receive, for example, a command and/or data from a user, and transfer the received command and/or data to the processor 120 and/or the memory 130 through the bus 110. The display 160 can display an image, a video, and/or data to a user.

The communication interface 170 can establish a communication 164 between the electronic device 101 and other electronic devices 102 and 104 and/or a server 106. The communication interface 170 can support short range communication protocols, e.g. a Wi-Fi protocol, a Bluetooth (BT) protocol, and a near field communication (NFC) protocol, communication networks, e.g. Internet, local area network (LAN), wireless area network (WAN), a telecommunication network, a cellular network, and a satellite network, or a plain old telephone service (POTS), or any other similar and/or suitable communication networks, such as network 162, or the like. Each of the electronic devices 102 and 104 may be a same type and/or different types of electronic apparatus.

Figure 2:
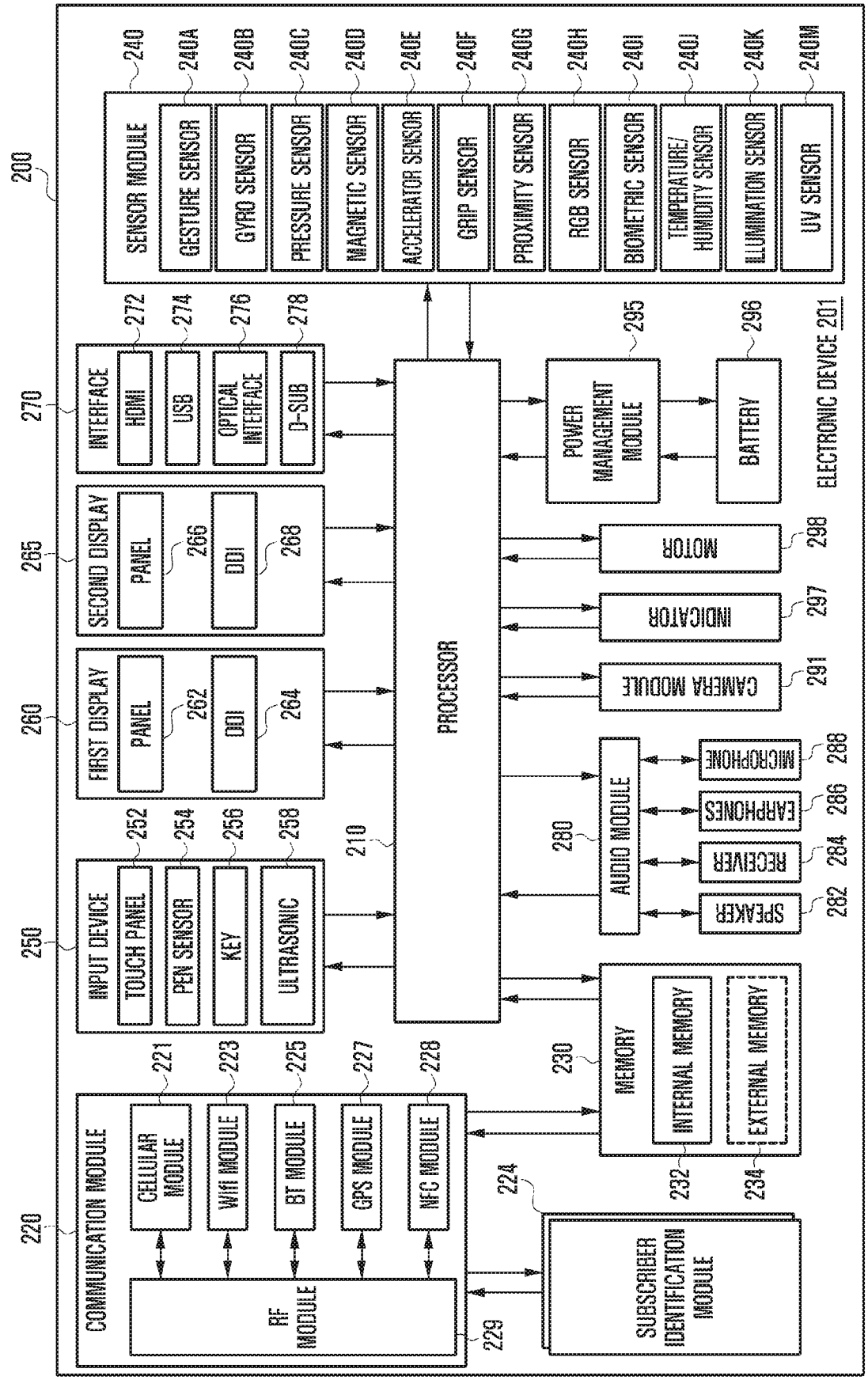
FIG. 2 is a block diagram of an electronic device according to various embodiments of the present disclosure.

FIG. 2 is a block diagram 200 illustrating an electronic device 201 in accordance with an embodiment of the present disclosure. The electronic device 201 may form, for example, the whole or part of the electronic device 101 shown in FIG. 1.

Referring to FIG. 2, the electronic device 201 may include at least one application processor (AP) 210 (e.g. at least one processor), a communication module 220 (e.g. a transceiver), a subscriber identification module (SIM) card 224, a memory 230, a sensor module 240, an input unit or input device 250, a first display 260, a second display 265, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment of the present disclosure, the AP 210 may further include a graphic processing unit (GPU) (not shown).

The communication module 220 (e.g., the communication interface 170 shown in FIG. 1) may perform a data communication with any other electronic device (e.g., the electronic device 104 or the server 106) connected to the electronic device 201 through the network. According to an embodiment of the present disclosure, the communication module 220 may include therein a cellular module 221, a Wi-Fi module 223, a BT module 225, a GPS module 227, an NFC module 228, and a radio frequency (RF) module 229.

The cellular module 221 may offer a voice call, a video call, a message service, an internet service, or the like through a communication network (e.g., long term evolution (LTE), LTE—advanced (LTE-A), code division multiple access (CDMA), wideband CDMA (WCDMA), universal mobile telecommunications system (UMTS), wireless broadband (WiBro), or global system for mobile communications (GSM), etc.). Additionally, the cellular module 221 may perform identification and authentication of the electronic device in the communication network, using the SIM card 224. According to an embodiment of the present disclosure, the cellular module 221 may perform at least part of functions the AP 210 can provide. For example, the cellular module 221 may perform at least part of a multimedia control function.

According to an embodiment of the present disclosure, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment of the present disclosure, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the Wi-Fi module 223, the BT module 225, the GPS module 227 and the NFC module 228 may include a processor for processing data transmitted or received therethrough. Although FIG. 2 shows the cellular module 221, the Wi-Fi module 223, the BT module 225, the GPS module 227 and the NFC module 228 as different blocks, at least part of them may be contained in a single integrated circuit (IC) chip or a single IC package in an embodiment. For example, at least part (e.g., the CP corresponding to the cellular module 221 and a Wi-Fi processor corresponding to the Wi-Fi module 223) of respective processors corresponding to the cellular module 221, the Wi-Fi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the Wi-Fi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an integrated circuit card Identifier (ICCID) or an international mobile subscriber identity (IMSI).

The memory 230 (e.g., the memory 230) may include an internal memory 232 and an external memory 234. The internal memory 232 may include, for example, at least one of a volatile memory (e.g., dynamic RAM DRAM), static RAM (SRAM), synchronous DRAM (SDRAM), etc.) or a nonvolatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment of the present disclosure, the internal memory 232 may have the form of a solid state drive (SSD). The external memory 234 may include a flash drive, e.g., compact flash (CF), secure digital (SD), micro secure digital (Micro-SD), mini secure digital (Mini-SD), eXtreme digital (xD), memory stick, or the like. The external memory 234 may be functionally connected to the electronic device 201 through various interfaces. According to an embodiment of the present disclosure, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric or pressure sensor 240C, a magnetic sensor 240D, an acceleration or accelerator sensor 240E, a grip sensor 240F, a proximity sensor 240G, a color or RGB sensor 240H (e.g., red, green, blue (RGB) sensor), a biometric sensor 240I, a temperature-humidity sensor 240J, an illumination sensor 240K, and a ultra-violet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment of the present disclosure, the electronic device 201 may receive a user input from any external device (e.g., a computer or a server) connected thereto through the communication module 220.

In an embodiment of the present disclosure, the display (e.g. display 160) may include a first display 260 and a second display 265. The first display 260 may include a first panel 262 and a first display driver IC (DDI) 264 configured to control the first panel 262. The first panel 262 may include a plurality of picture elements or pixels, and each pixel may include sub pixels to represent RGB primary colors of light. Each sub pixel may include at least one transistor, and the transistor may adjust the corresponding sub pixel according to the amount of the applied voltage (or current) to represent the color. The first DDI 264 may include a gate driver circuit 940 to perform on and off functions and control gates of RGB sub pixels, and a source driver circuit 950 to produce color differences by adjusting video signals of RGB sub pixels. The first DDI 264 may control the transistors of the sub pixels of the first panel 262 to constitute the full screen. The first DDI 264 may be configured to receive first image data from the processor 210 and display a corresponding image on the first panel 262.

The second display 265 may include a second panel 266 and a second DDI 268 configured to control the second panel 266. The second panel 266 may include a plurality of picture elements or pixels, and each pixel may include sub pixels to represent RGB primary colors of light. Each sub pixel may include at least one transistor, and the transistor may adjust the corresponding sub pixel according to the amount of the applied voltage (or current) to represent the color. The second DDI 268 may include a gate driver circuit 940 to perform on and off functions and control gates of RGB sub pixels, and a source driver circuit 950 to produce color differences by adjusting video signals of RGB sub pixels. The second DDI 268 may control the transistors of the sub pixels of the second panel 266 to constitute the full screen. The second DDI 268 may be configured to receive second image data, identical to or different from the first image data, from the processor 210 and display a corresponding image on the second panel 266.

In various embodiments, at least one of the first panel 262 and the second panel 266 may be realized as being flat, flexible, or bendable. At least one of the first panel 262 and the second panel 266 may include one or more components such as the touch panel 252 and the pen sensor 254.

The first display 260 and the second display 265 (e.g. display 160) may support different image output schemes (e.g. hologram and projection) and include a control circuit to control the schemes.

In an electronic device having multiple displays, the processor 210 may process at least a portion of content varying in various modules and components (e.g. image data or image data streams). The processor 210 may control at least one of the first display 260 and the second display 265 to display variable content. For example, the processor 210 may control the first display 260 to display a command received through the communication module 220 and control the second display 265 to display a command received through the sensor module 240. As another example, the processor 210 may control the second display 265 to display an enlarged version of screen data displayed on the first display 260 or control the first display 260 to display an enlarged version of screen data displayed on the second display 265 with enlargement.

The interface 270 may include, for example, a high-definition multimedia interface (HDMI) 272, a universal serial bus (USB) 274, an optical interface 276, or a D-sub-miniature (D-sub) 278. The interface 270 may be contained, for example, in the communication interface 170 shown in FIG. 1. Additionally or alternatively, the interface 270 may include, for example, a mobile high-definition link (MHL) interface, a secure digital (SD) card/multi-media card (MMC) interface, or an infrared data association (IrDA) interface.

The audio module 280 may perform a conversion between sounds and electric signals. The audio module 280 may process sound information inputted or outputted through a speaker 282, a receiver 284, an earphone or earphones 286, or a microphone 288.

The camera module 291 is a device capable of obtaining still images and moving images. According to an embodiment of the present disclosure, the camera module 291 may include at least one image sensor (e.g., a front sensor or a rear sensor), a lens (not shown), an image signal processor (ISP), not shown), or a flash (e.g., light emitting diode (LED) or xenon lamp, not shown).

The power management module 295 may manage electric power of the electronic device 201. Although not shown, the power management module 295 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 3:
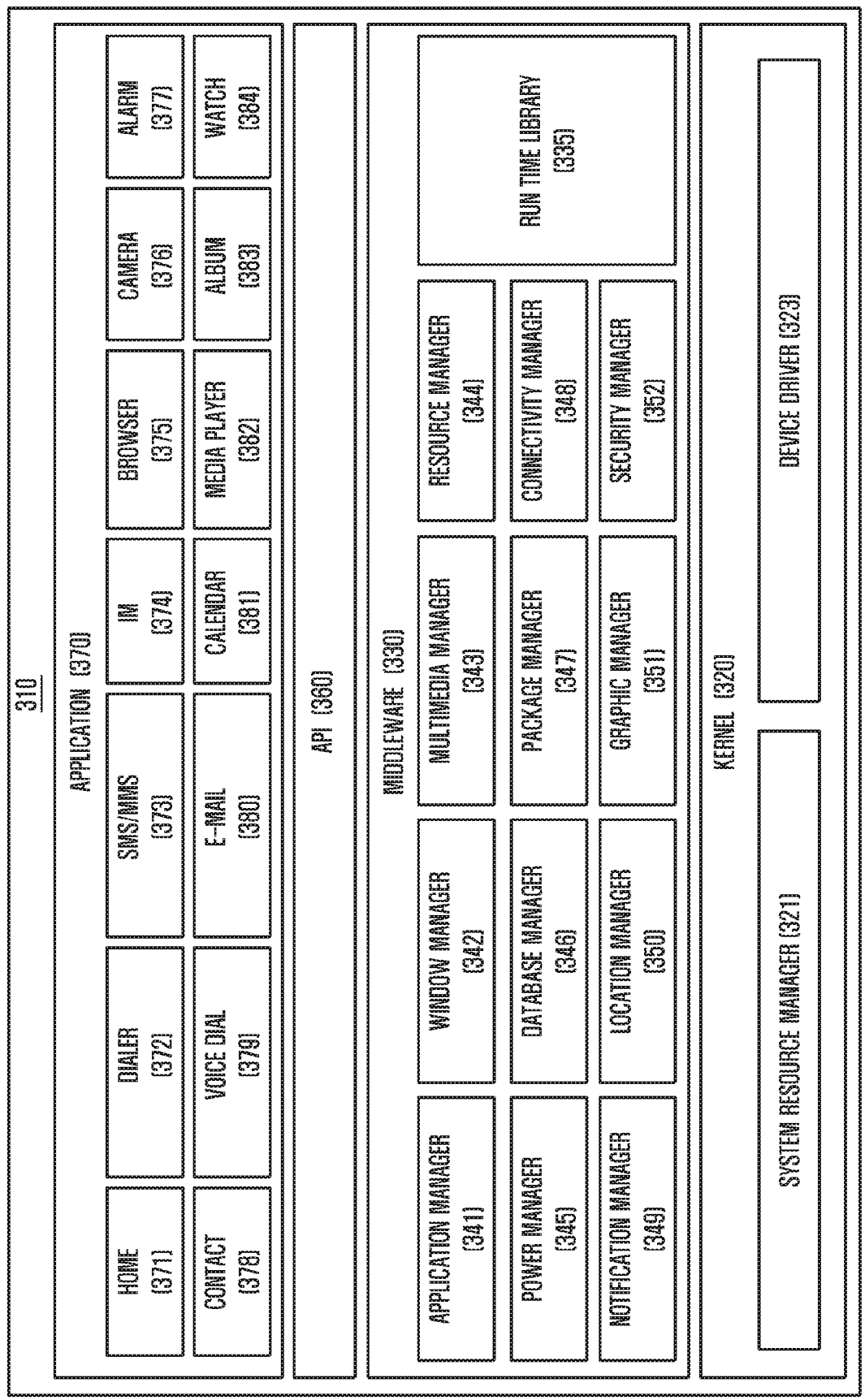
FIG. 3 is a block diagram of a program module according to various embodiments of the present disclosure.

FIG. 3 is a block diagram illustrating a configuration of a programming module 310 according to an embodiment of the present disclosure.

The programming module 310 may be included (or stored) in the electronic device 201 (e.g., the memory 230) illustrated in FIG. 2 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android™ iOS™, Windows™, Symbian®, Tizen®, Bada®, and the like.

Referring to FIG. 3, the programming module 310 may include a kernel 320, a middleware 330, an API 360, and/or the application 370.

The kernel 320 (e.g., the kernel 141 shown in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 142 shown in FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The application programming interface (API) 360 (e.g., the API 142 shown in FIG. 1) is a set of API programming functions, and may be provided with a different configuration according to an OS. In the case of Android™ or iOS™, for example, one API set may be provided to each platform. In the case of Tizen®, for example, two or more API sets may be provided to each platform.

The applications 370 (e.g., the applications 144 shown in FIG. 1) may include, for example, a preloaded application and/or a third-party application. The applications 370 (e.g., the applications 247) may include, for example, a home application 371, a dialer application 372, a short message service (SMS)/multimedia message service (MMS) application 373, an instant message (WI) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

Hereinafter, a description is given of various embodiments of the present disclosure enabling multitasking during image sharing with reference to FIGS. 4 to 17.

In various embodiments, the electronic device may have at least two displays. In the electronic device, the displays may be physically and/or electrically separated from each other, and may be used to output different images or separate portions of the same image. In an embodiment of the present disclosure, the electronic device may have only one display and output different images on separate regions of the display.

An external device may be a device having a display and may have a type identical to or different from that of the electronic device. For ease of description, it is assumed that the electronic device is a mobile terminal having a small display and the external device is a TV having a large display. However, the present disclosure is not limited thereto or thereby. The external device supports wireless communication such as Wi-Fi, Bluetooth, near field communication (NFC), and global navigation satellite system (GNSS), and may receive image data for sharing from the electronic device through wireless communication and output the received image data on the display.

An access point refers to an equipment that enables a wireless device such as an electronic device to access a network. The communication circuit of the electronic device may send and receive data to and from the network through an access point. The electronic device may send and receive data to and from the external device in peer-to-peer (P2P) mode without using an access point (e.g. Wi-Fi direct).

Figure 4A:
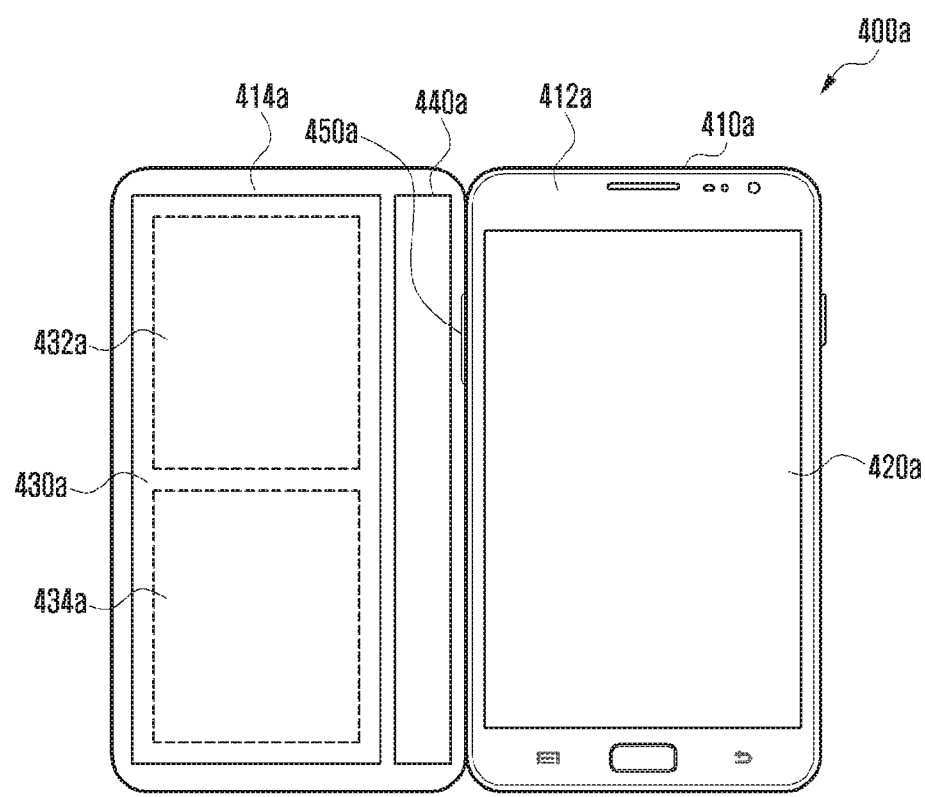
FIGS. 4A, 4B, 4C and 4D illustrate configurations of the display of an electronic device according to various embodiments of the present disclosure.
Figure 4B:
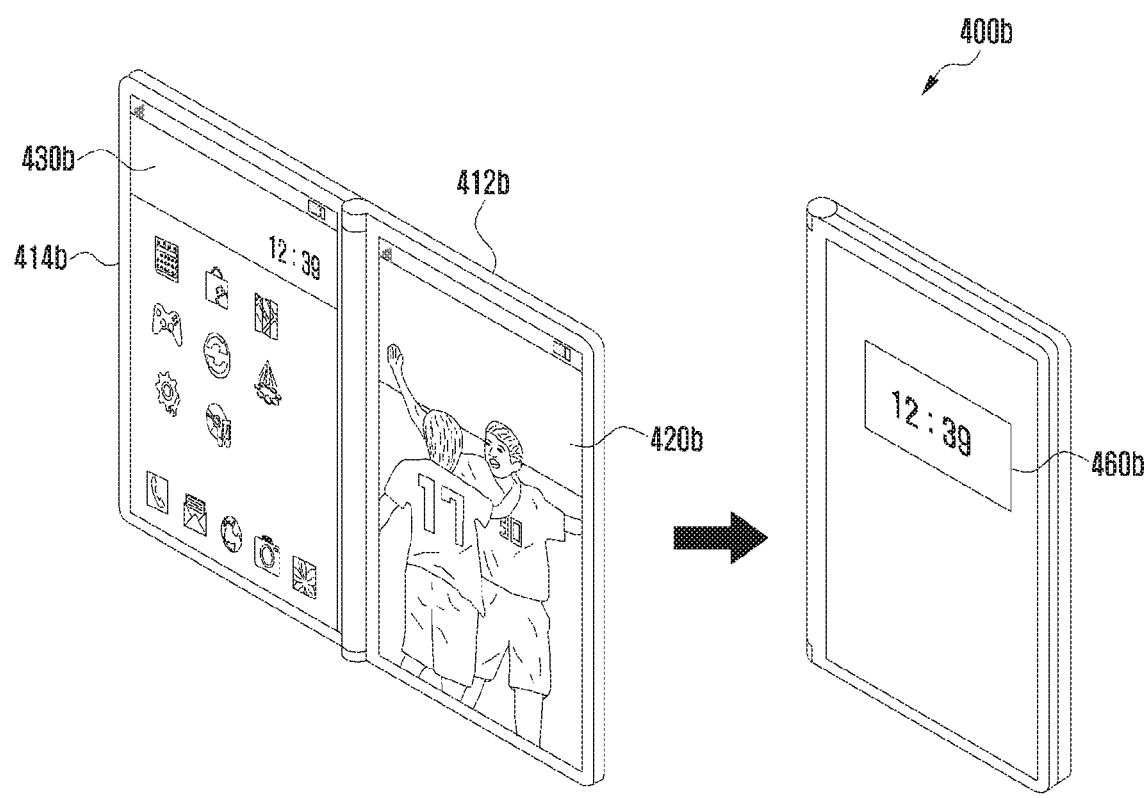

FIGS. 4A to 4B illustrate configurations of the display of the electronic device according to various embodiments of the present disclosure. The electronic device has a housing, and may include a first display on a first portion of the housing and a second display separate from the first display on a second portion of the housing.

FIG. 4A illustrates an electronic device having multiple displays arranged respectively in foldable regions of the housing.

Referring to FIG. 4A, the electronic device 400a (e.g. electronic device 101) may have multiple displays including at least a first display 420a and a second display 430a. As shown, the housing 410a may include two separable sub housings, for example, a body housing 412a and a cover housing 414a. A hinge 450a may be arranged between the body housing 412a and the cover housing 414a so as to foldably couple the body housing 412a and the cover housing 414a.

The first display 420a may be formed in a region (e.g. front surface) of the body housing 412a. The second display 430a may be formed in a region of the cover housing 414a capable of covering at least a portion (e.g. first display 420a) of the body housing 412a. In an embodiment of the present disclosure, the second display 430a may include, for example, different transparent display areas or mirror display areas.

In some embodiments, the second display 430a may include multiple display areas (e.g. display areas 432a and 434a). Among the multiple display areas, at least one first display area (e.g. display area 434a) may have attributes (e.g., size, shape, brightness, color, saturation, sharpness, transmittance, gamma, resolution, contrast, viewing angle, color gamut, color temperature, grayscale linearity, and transparency) different from those of at least one second display area (e.g. display area 432a); and the attributes (e.g., size, shape, brightness, color, saturation, sharpness, transmittance, gamma, resolution, contrast, viewing angle, color gamut, color temperature, grayscale linearity, and transparency) of at least one first display area (e.g. display area 434a) may be adjusted independently of those of at least one second display area (e.g. display area 432a). In an embodiment of the present disclosure, the display area 434a may be one of a transparent display area and a mirror display area.

In some embodiments, the electronic device 400a may further include a third display 440a. The third display 440a may be formed on the other portion of the cover housing 414a of the electronic device 400a. For example, in the case where the second display 430a is formed on a portion of the top surface of the cover housing 414a, the third display 440a may be formed on another portion of the top surface of the cover housing 414a, on a portion of the bottom surface of the cover housing 414a, or on a portion of the top or bottom surface of the cover housing 414a covering at least a portion of the side surface of the body housing 412a. In an embodiment of the present disclosure, the third display 440a may include, for example, different transparent display areas or mirror display areas.

In FIG. 4A, the body housing 412a and the cover housing 414a are fully unfolded. The body housing 412a and the cover housing 414a may be rotated around the axis of the hinge 450a. For example, the cover housing 414a may be rotated so that the top surface of the body housing 412a including the first display 420a is completely covered with the top surface of the cover housing 414a including the second display 430a. In FIG. 4A, the first display 420a and the second display 430a are arranged so that they face each other when the electronic device 400a is folded. However, in another embodiment, at least one of the first display 420*a* and the second display 430*a* may be placed on the outer surface of the electronic device 400*a* (e.g. on the opposite surface of the body housing 412*a* or the cover housing 414*a*). The first display 420*a* and the second display 430*a* may be of the same shape.

Referring to FIG. 4B, among the multiple displays of the electronic device, at least one display (e.g. second display 430*b*) may be formed on the inner surface of the cover housing 414*b* (e.g. on the surface of the cover housing 414*b* in a direction facing the reverse side of the display of the body housing 412*b* when the cover housing 414*b* is closed). When the cover housing 414*b* is closed so as to contact the rear surface of the body housing 412*b*, the multiple displays may be arranged on both sides of the cover housing 414*b* and the body housing 412*b*. When the cover housing 414*b* is fully closed, screen data of one display (e.g. second display 430*b*) may be transferred to another display (e.g. fourth display 460*b*). For example, when the cover housing 414*b* is closed, at least a portion of screen data on the second display 430*b* may be displayed on the fourth display 460*b* formed on the reverse side of the second display 430*b* in the cover housing 414*b*.

In an embodiment of the present disclosure, the electronic device 400*b* may be folded in the opposite direction. For example, when the electronic device 400*b* is folded in the opposite direction, the second display 430*b* and the first display 420*b* may be placed respectively in the front face and the rear face of the electronic device 400*b*.

In an embodiment of the present disclosure, among the multiple displays, the fourth display 460*b* may be driven with less power in comparison to the other displays. The fourth display 460*b* operating in low power mode may be configured to continuously display designated information (e.g. current time, battery status, electric field status, or various notification information regarding received messages or missed calls) unless a designated input (e.g. screen lock key) is received. The fourth display 460*b* may be operated by the main processor (e.g. processor 120) of the electronic device 400*b*. Alternatively, the electronic device 400*b* may include a separate low-power processor (not shown) to drive the fourth display 460*b* in low power mode. When the electronic device 400*b* includes a low-power processor, the low-power processor may control the fourth display 460*b* to display the designated information.

In an embodiment of the present disclosure, the electronic device 400*b* may determine the display to be used for presenting designated information (e.g. current time, battery status, electric field status, or various notification information regarding received messages or missed calls) among the multiple displays according to the opening and closing of the cover housing 414*b*. For example, when the cover housing 414*b* is closed, the electronic device 400*b* may output the designated information on the fourth display 460*b*. When the cover housing 414*b* is open, the electronic device 400*b* may output the designated information on the second display 430*b* or on the display formed in the body housing 412*b* (e.g. first display 420*b*).

Figure 4C:
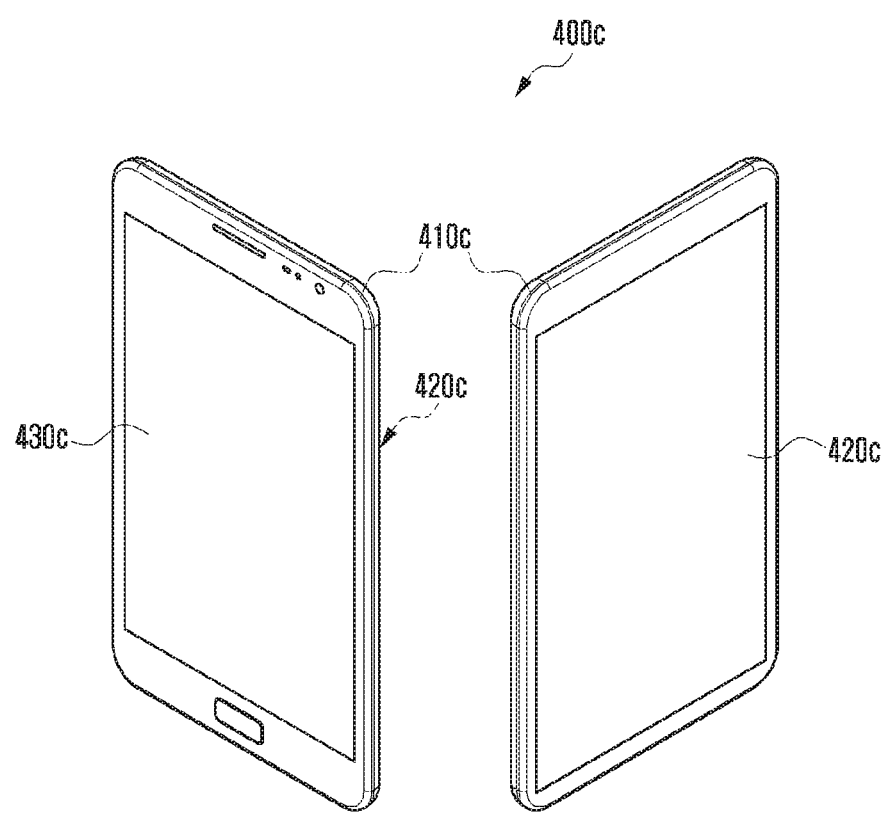

FIG. 4C illustrates an electronic device having displays in the front and rear surfaces of the housing according to an embodiment of the present disclosure.

Referring to FIG. 4C, the first display 420*c* may be formed on the front surface of the housing 410*c*, and the second display 430*c* may be formed on the rear surface thereof in the opposite direction. A home key, a front-facing camera, and the like may be further included in the front surface of the housing 410*c*, and a rear-facing camera, a speaker, and the like may be further included in the rear surface of the housing 410*c*. In an embodiment of the present disclosure, the front face of the housing 410*c* or the electronic device 400*c* may be the same as the rear face thereof.

Figure 4D:
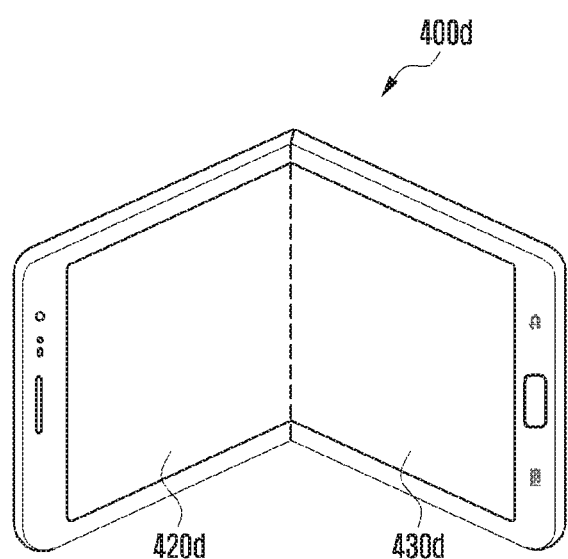

FIG. 4D illustrates an electronic device having a flexible display according to an embodiment of the present disclosure.

Referring to FIG. 4D, the display of the electronic device 400*d* may be bent in one direction or in both directions. Other hardware components of the electronic device 400*d* including the housing may be bendable in the same manner as the display. When the display is bent at an angle greater than or equal to a threshold, the display may be divided into two display areas with respect to the axis of bending and one of the display areas may be defined as the first display 420*d* and the other may be defined as the second display 430*d*.

Each of the electronic devices 400*a*, 400*b*, 400*c*, 400*d* shown in FIGS. 4A, 4B, 4C, and 4D is described as having two displays. However, the arrangements of displays are not limited thereto. The electronic device may have three or more displays or the electronic device may have a single display that can be used as multiple displays. For instance, a single plastic organic light-emitting diode display (POLED) display may be bent or folded to provide two or more displays.

Figure 5:
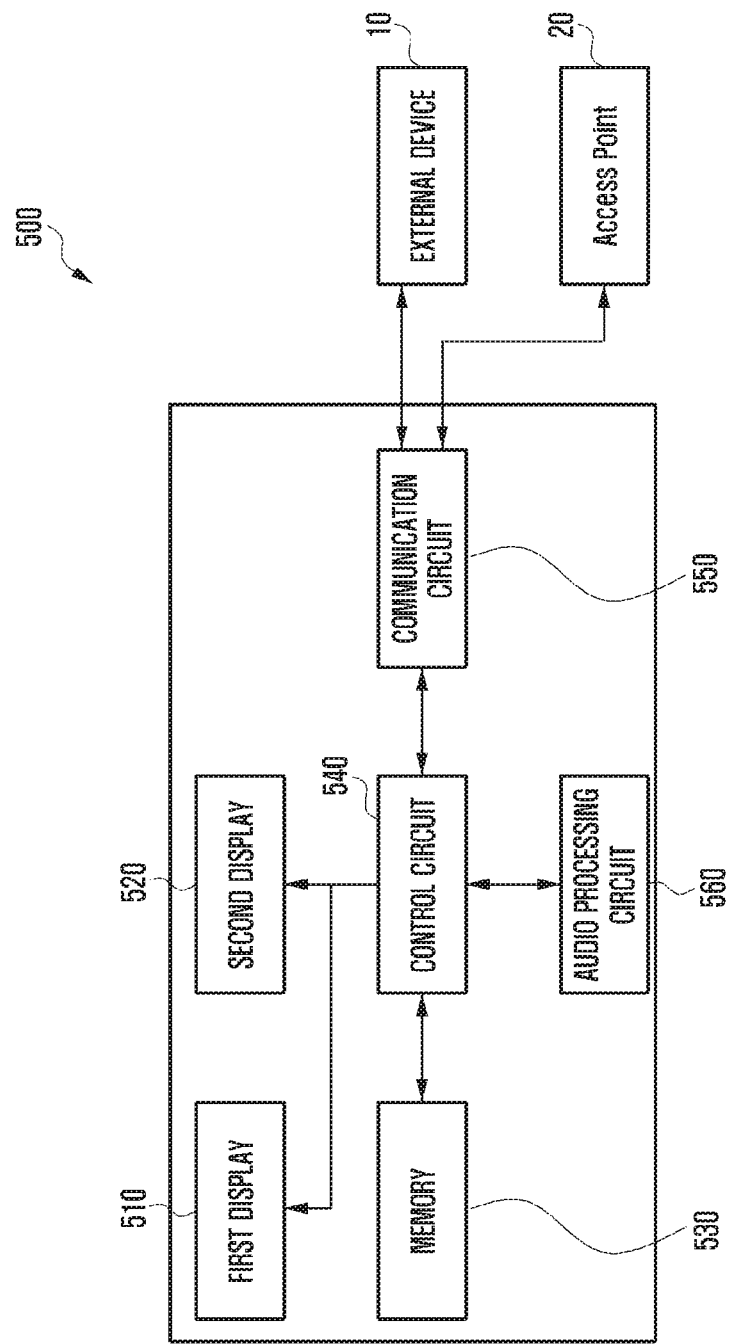
FIG. 5 is a block diagram of an electronic device according to various embodiments of the present disclosure.

FIG. 5 is a block diagram of an electronic device 500 according to various embodiments of the present disclosure.

Referring to FIG. 5, the electronic device 500 may include a first display 510, a second display 520, a memory 530, a control circuit 540 (e.g. at least one processor), a communication circuit 550 (e.g. a transceiver), and an audio processing circuit 560 (e.g. audio processor). One or more of the listed components may be omitted or replaced without deviating from the subject matter of the present disclosure. The electronic device 500 may include one or more of the components of the electronic device 101 or 201 shown in FIG. 1 or 2.

The first display 510 and the second display 520 may each display images and may each be realized using a display technology based on liquid crystals (LC), light-emitting diodes (LED), organic light-emitting diodes (OLED), micro electro mechanical systems (MEMS), or electronic paper. The first display 510 and the second display 520 may each include one or more of the elements constituting the display 160 or 260 shown in FIG. 1 or 2.

The first display 510 may be placed on a first portion of the housing, and the second display 520 may be placed on a second portion of the housing in separation from the first display 510. Various arrangements of the first display 510 and the second display 520 in the electronic device 500 are described above in connection with FIGS. 4A, 4B, and 4C.

The communication circuit 550 is configured to send and receive data to and from an external device 10, and may include at least one of the components constituting the communication interface 170 of FIG. 1 or the communication module 220 of FIG. 2. The communication circuit 550 may communicate with the external device 10 and/or an access point 20 through wireless local area communication like Wi-Fi. The communication circuit 550 may have two or more antennas, which may be used to transmit and receive data through different frequency bands. The configuration of the communication circuit 550 is described in more detail later with reference to FIG. 8.

The memory 530 may include a volatile memory and a non-volatile memory known in the art without particular restrictions. The memory 530 may be electrically connected with the control circuit 540 and may store various instructions executable by the control circuit 540. The instructions may include arithmetic operations, logical operations, data movement operations, input/output operations, and control operations, which can be recognized by the control circuit 540.

The control circuit 540 is configured to perform control, communication, or data handling operations for the individual components of the electronic device 500, and may include at least one of the elements constituting the control circuit or at least one processor 120 of FIG. 1 or the application control circuit or application processor 210 of FIG. 2. The control circuit 540 may be electrically connected with the various components of the electronic device 500 including the first display 510, second display 520, memory 530, communication circuit 550, and audio processing circuit 560. Although there is no particular restriction on the operational and data handling functions implementable by the control circuit 540 in the electronic device 500, the following description focuses on transmission and control functions performed by the control circuit 540 for displaying images on the display and controlling the communication circuit 550 to transfer images to the external device 10. The operations of the control circuit 540 to be described below may be executed by loading instructions stored in the memory 530 as described above.

The audio processing circuit 560 is configured to process, amplify, and output audio signals. The audio processing circuit 560 may control output of an audio signal through a speaker of the electronic device 500 or through an earphone (or external speaker) wiredly or wirelessly connected to the electronic device 500.

The control circuit 540 may supply a first image to the first display 510 and supply a second image to the second display 520. The first display 510 and the second display 520 may display the first image and the second image, respectively. Here, the first image and the second image may be displayed at the same time. The first image from the control circuit 540 may be supplied to the first display 510 through a first interface, and the second image may be supplied to the second display 520 through a second interface along a path independent of the first image.

When the image sharing function is enabled, the control circuit 540 may supply the communication circuit 550 with data associated with one of the first image and the second image selected by the user. Here, the associated data may be image data corresponding to one of the first image and the second image. The communication circuit 550 may establish a communication channel of P2P mode with the communication circuit of the external device 10 when the image sharing function is initiated. At this time, the communication circuit 550 may receive identification information and display capability information of the external device 10.

The communication circuit 550 may send the external device 10 data associated with one of the first image and the second image under the control of the control circuit 540. In the following description, the data sent to the external device 10 through the communication circuit 550 is referred to as "sharing data". Next, a description is given of operations involved in transmitting the first image displayed on the first display 510 to the external device 10 according to user selection.

For example, to share the first image displayed on the first display 510 with the external device 10 according to user selection, the control circuit 540 may send the first image to the first display 510 through the first interface and send the first image to the external device 10 through the communication circuit 550 at the same time. Hence, the first image may be output on the first display 510 and the display of the external device 10, and the second image may be output on the second display 520 in parallel with display of the first image. Here, the control circuit 540 may generate the sharing data from the first image data in consideration of attributes of the external device 10 such as screen size and orientation. For example, when the first display 510 is in portrait orientation and the display of the external device 10 is in landscape orientation, the control circuit 540 may generate the sharing data by changing the orientation of the first image from portrait to landscape according to the display attribute of the external device 10.

In the case where the first image and the second image are accompanied respectively by first audio data and second audio data, when the image sharing function is executed according to the related art technology, the first audio data and second audio data may be mixed together and the mixed audio data may be sent to the external device 10 or output by the electronic device 500. In the electronic device 500 of the present disclosure, when the image sharing function is initiated for the first image, the control circuit 540 may send the first audio data associated with the first image to the external device 10 through the communication circuit 550 and send the second audio data associated with the second image to the audio processing circuit 560. Hence, the first image and associated first audio data may be output by the external device 10 for sharing, and the second audio data associated with the second image to be output only by the electronic device 500 may be output through the speaker of the electronic device 500 or through an earphone (or external speaker) wiredly or wirelessly connected to the electronic device 500.

In an embodiment of the present disclosure, when the external device 10 does not have a speaker for audio output, the first audio data may be output through the speaker of the electronic device 500 and the second audio data may be output through an earphone or headset wiredly or wirelessly connected to the electronic device 500.

The electronic device 500 may support multitasking for all available functions when the image sharing function is initiated. For example, to output a popup window in response to a specific event (e.g. reception of a social networking service (SNS) message or reception of a push message), the control circuit 540 may display the popup window on the second display 520 as a higher layer above the second image not being shared. Likewise, upon reception of an incoming call, the control circuit 540 may display a call handling window on the second display 520. At this time, the first display 510 and the external device 10 may continue to display the first image.

To display a menu window for controlling the shared first image (e.g. playback interval change, size or resolution adjustment, or volume adjustment), the electronic device 500 may display the menu window on the second display 520 other than the first display 510. As such, the first image may be continuously displayed on the first display 510 and the external device 10 while the menu window is being displayed.

In an embodiment of the present disclosure, the menu window for controlling the first image may be displayed on the first display 510 together with the first image. In this case, the menu window may be displayed as a higher layer above the second image. Alternatively, the first image may be reduced in size and the menu window may be displayed in the corresponding region secured by size reduction. Although a menu or popup window is displayed on the first display 510, as only the sharing data is sent to the external device 10, the menu or popup window is not displayed on the display of the external device 10.

Figure 6:
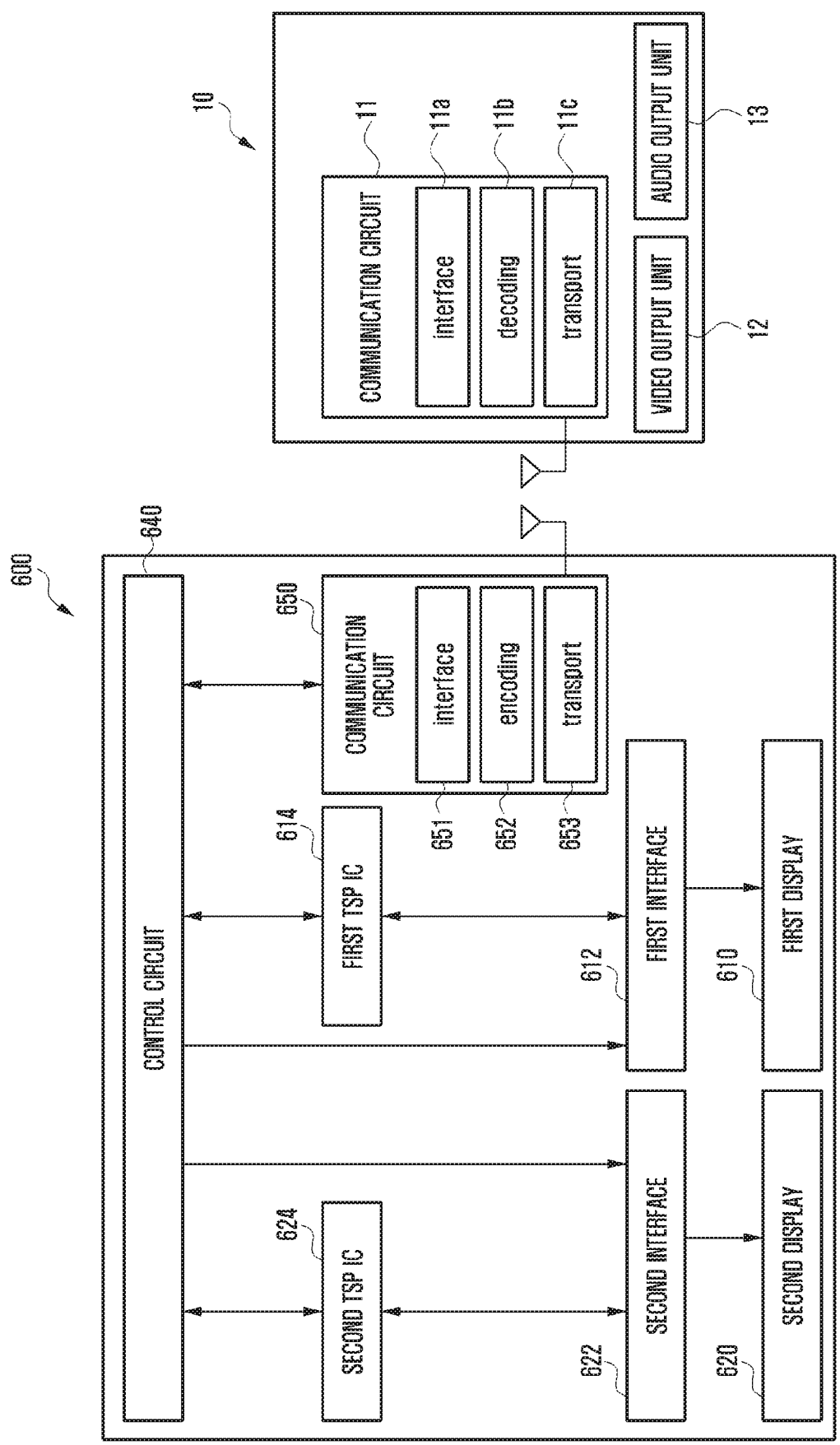
FIG. 6 illustrates components of the electronic device for sharing images with an external device according to various embodiments of the present disclosure.

FIG. 6 illustrates components of the electronic device 600 for sharing images with an external device according to various embodiments of the present disclosure. Hereinafter, a description is given of data flows between the individual components and operations thereof when the image sharing function is initiated for the first image in response to detection of an input on the electronic device 600.

In an embodiment of the present disclosure, the electronic device 600 may include a control circuit 640 (e.g. at least one processor), a first touchscreen panel (TSP) integrated circuit (IC) 614, a second TSP IC 624, a first interface 612, a second interface 622, a first display 610, a second display 620, and a communication circuit 650 (e.g. a transceiver).

The TSP IC refers to an IC (or control circuit) for controlling a touchscreen combined with a display as a single entity. The first TSP IC 614 may sense a user touch input on the first display 610, and the second TSP IC 624 may sense a user touch input on the second display 620.

The electronic device 600 may have a dual display interface (DDI) structure. That is, the electronic device 600 includes a first interface 612 to supply images to the first display 610 and a second interface 622 to supply images to the second display 620, and the first interface 612 and the second interface 622 may be used to form independent paths. The control circuit 640 may output a first image and a second image to the first interface 612 and the second interface 622, respectively and independently.

When the image sharing function is initiated for the first image, the control circuit 640 may supply data associated with the first image (i.e. sharing data) to the communication circuit 650. In the communication circuit 650, the sharing data may be received from the control circuit 640 through the interface 651; the sharing data may be encoded by the encoding end 652; and the sharing data may be modulated, amplified, and wirelessly transmitted by the transport end 653 to the external device 10.

In an embodiment of the present disclosure, the external device 10 may include a communication circuit 11, a video output unit 12, and an audio output unit 13.

In the communication circuit 11 (e.g. a transceiver) of the external device 10, the transport end 11c may wirelessly receive sharing data; the decoding end 11b may decode the received sharing data; and the interface end 11a may separate the decoded sharing data into video data and audio data and supply the video data and the audio data respectively to the video output unit 12 and the audio output unit 13.

Figure 7:
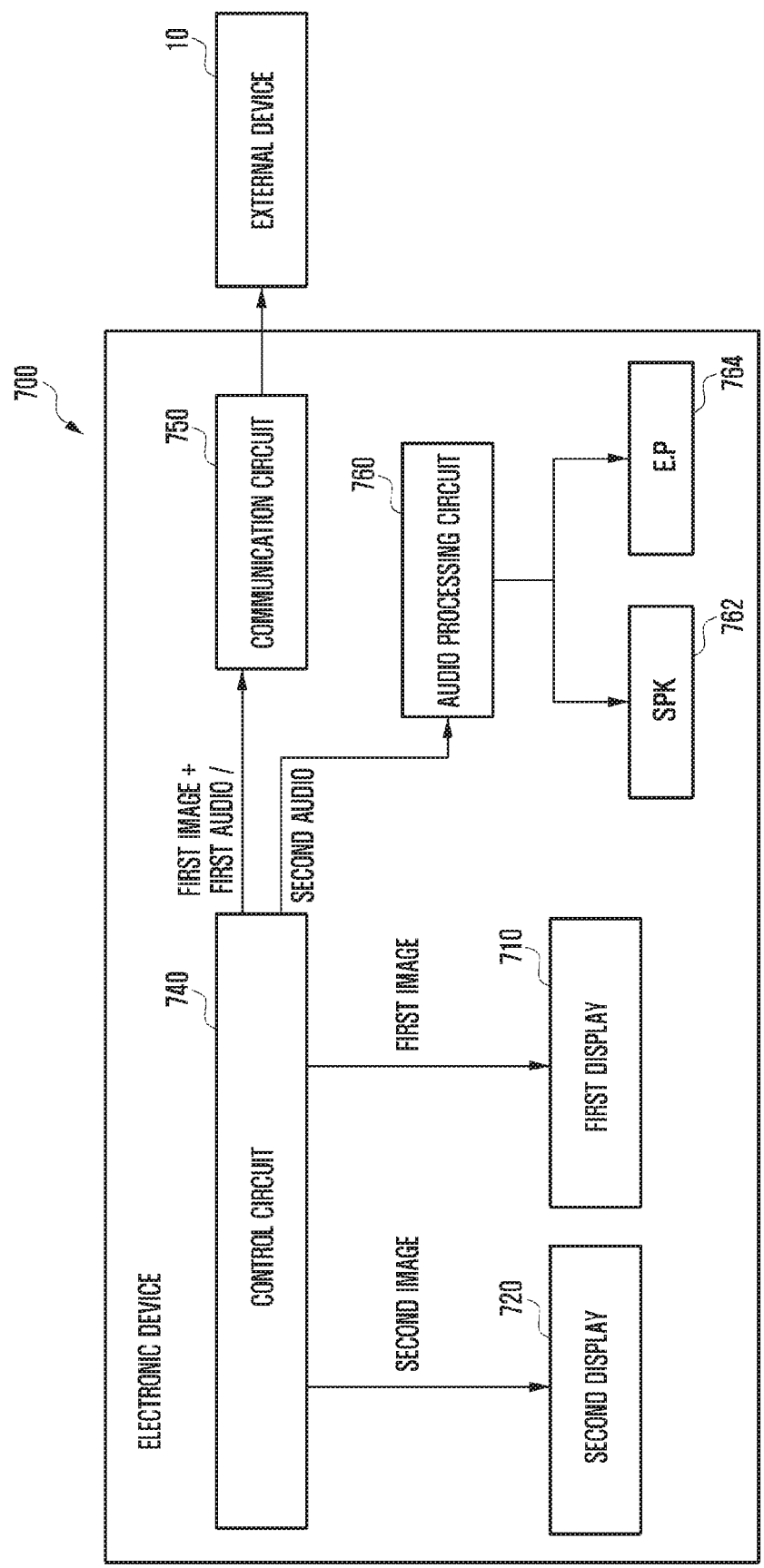
FIG. 7 illustrates components of the electronic device for audio processing according to various embodiments of the present disclosure.

FIG. 7 illustrates components of the electronic device 700 for audio processing according to various embodiments of the present disclosure.

When the image sharing function is initiated, the first image may be sent to the first display 710 and the second image may be sent to the second display 720. In the case where the first image and the second image are accompanied respectively by first audio data and second audio data, it may be preferable that the first audio data is output together with the shared first image in the external device.

To this end, the control circuit 740 (e.g. at least one processor) may send the first image and the first audio data to the external device through the communication circuit 750 (e.g. a transceiver) and send the second audio data to the audio processing circuit 760 (e.g. an audio processor). Hence, the first image and associated first audio data may be output by the external device for sharing, and the second audio data associated with the second image to be output only by the electronic device 700 may be output through the speaker or SPK 762 of the electronic device 700 or through an earphone or E.P. 764 (or external speaker) wiredly or wirelessly connected to the electronic device 700.

In an embodiment of the present disclosure, when the external device 10 does not have a speaker for audio output, the control circuit 740 may send both the first audio data and the second audio data to the audio processing circuit 760, and the audio processing circuit 760 may output the first audio data to the speaker 762 and output the second audio data to the earphone 764.

Figure 8:
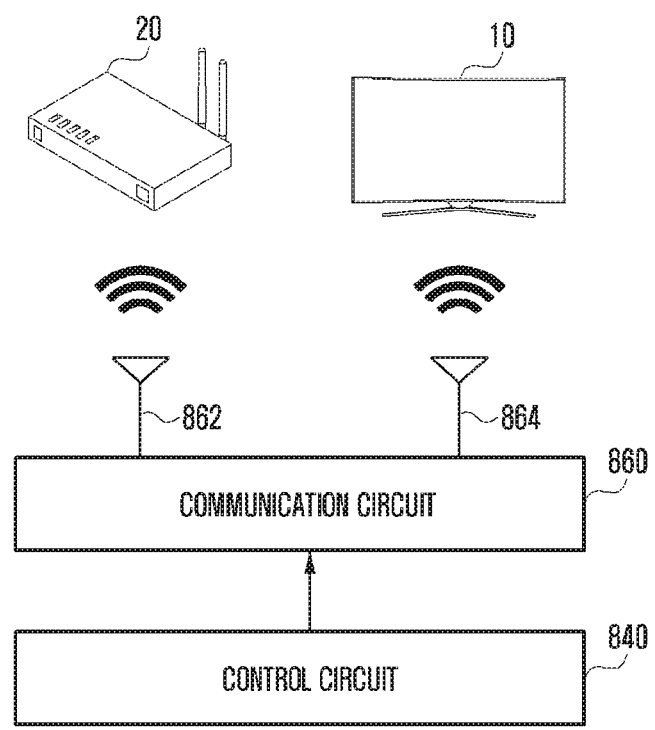
FIG. 8 illustrates details of a communication circuit according to various embodiments of the present disclosure.

FIG. 8 illustrates details of the communication circuit 860 (e.g. a transceiver) of the electronic device according to various embodiments of the present disclosure.

The communication circuit 860 (e.g. a transceiver) may include multiple antennas, which may send and receive data using different frequency bands. For example, the communication circuit 860 may have two antennas, and the first antenna 862 may use a first frequency band (e.g. 5 GHz) to send and receive data and the second antenna 864 may use a second frequency band (e.g. 2.5 GHz) to send and receive data. The communication circuit 860 may be implemented as a single chip, and may have processing circuits to encode, encrypt, and amplify baseband signals destined respectively for the first antenna 862 and the second antenna 864.

In an embodiment of the present disclosure, according to whether the image sharing function is initiated, the communication circuit 860 may use the first antenna 862 and the second antenna 864 in the following way under the control of the control circuit 840 (e.g. at least one processor).

When the image sharing function is not initiated, the communication circuit 860 may use the two antennas for multiple-input multiple-output (MIMO) to perform data transmission and reception using a wider bandwidth.

When the image sharing function is initiated, one of the first antenna 862 and the second antenna 864 (e.g. first antenna 862) may be configured to communicate with the access point 20, and the other thereof (e.g. second antenna 864) may be configured to establish a communication channel with the communication circuit of the external device 10 for P2P mode communication. At this time, the identification information and display capability information of the external device 10 may be received through the second antenna 864.

For example, in the case where the electronic device simultaneously executes a video player and a web browser, for image sharing, network data requested by the web browser may be received from the access point 20 through the first antenna 862, and image data produced by the video player may be sent to the external device 10 through the second antenna 864.

Figure 9A:
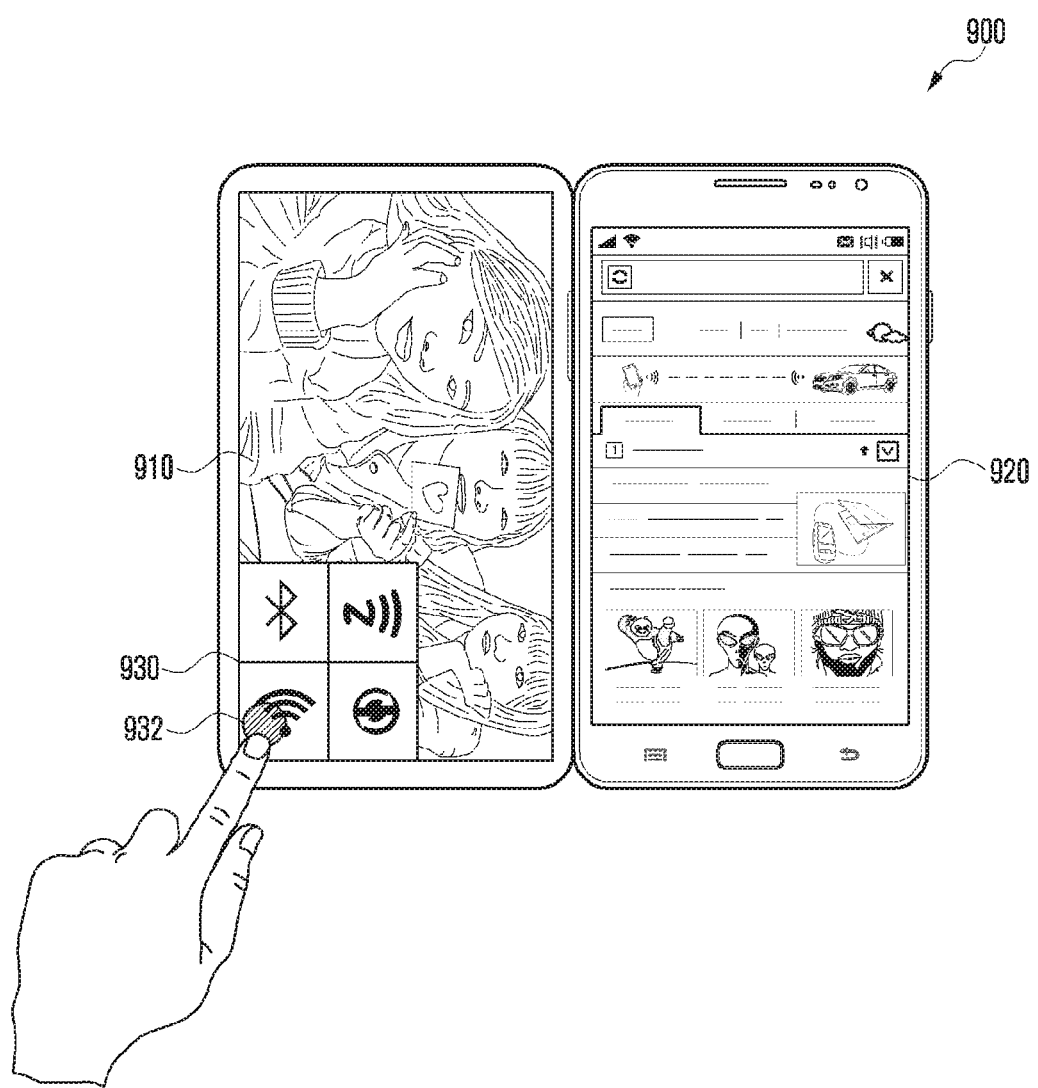
FIGS. 9A and 9B are screen representations depicting entering image sharing mode according to various embodiments of the present disclosure.
Figure 9B:
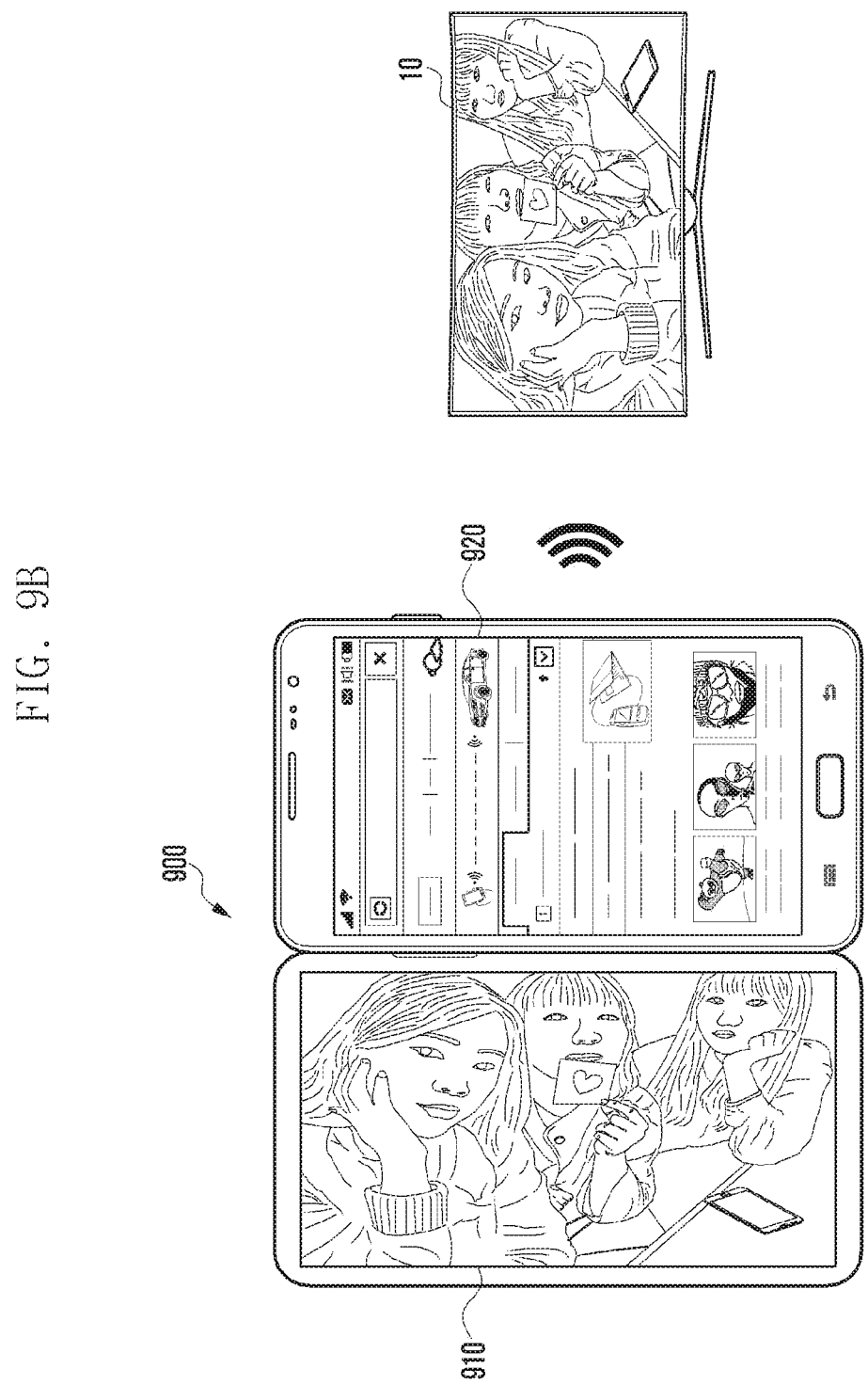

FIGS. 9A and 9B are screen representations depicting entering image sharing mode according to various embodiments of the present disclosure.

In an embodiment of the present disclosure, when a specified input (e.g. gesture, touch, button press, or voice input) is detected on the first display 910 or second display 920 of the electronic device 900, the control circuit (e.g. at least one processor 120 of FIG. 1 or control circuit 540 of FIG. 5) may display a menu 930 for image sharing on the display where the input is detected. When the image sharing function is initiated through the menu 930, the control circuit may control the communication circuit (e.g. communication interface 170 of FIG. 1 or communication circuit 550 of FIG. 5) to data associated with one of the first image and the second image output on the display where the input is detected.

For example, when a specified input (e.g. long press on a screen region or gesture involving touch and movement) is detected on the first display 910, the electronic device 900 may output a preset menu 930 on the first display 910. The menu 930 may contain various icons and text strings mapped with different functions. When an input is detected on the second display 920, the electronic device 900 may output the menu 930 on the second display 920.

When an icon 932 mapped with the image sharing function is selected from the menu 930, the communication circuit of the electronic device 900 may establish a communication channel with an external device. For example, referring to FIG. 9B, the electronic device 900 may send data associated with the first image output on the first display 910 to the external device 10 through the communication circuit, and the external device 10 may display the first image on the display thereof on the basis of the received data. Here, the first image and the second image may still be output respectively on the first display 910 and the second display 920.

In an embodiment of the present disclosure, when a preset application is executed or preset content is played back, the electronic device 900 may, automatically without a separate input, output a first image on the first display 910 and send sharing data associated with the first image to the external device 10 at least partially in parallel with display of the first image.

In addition, the first audio data associated with the first image may be sent to the external device 10 and output by the external device 10, and the second audio data associated with the second image may be output through the speaker or earphone of the electronic device 900.

Figure 10A:
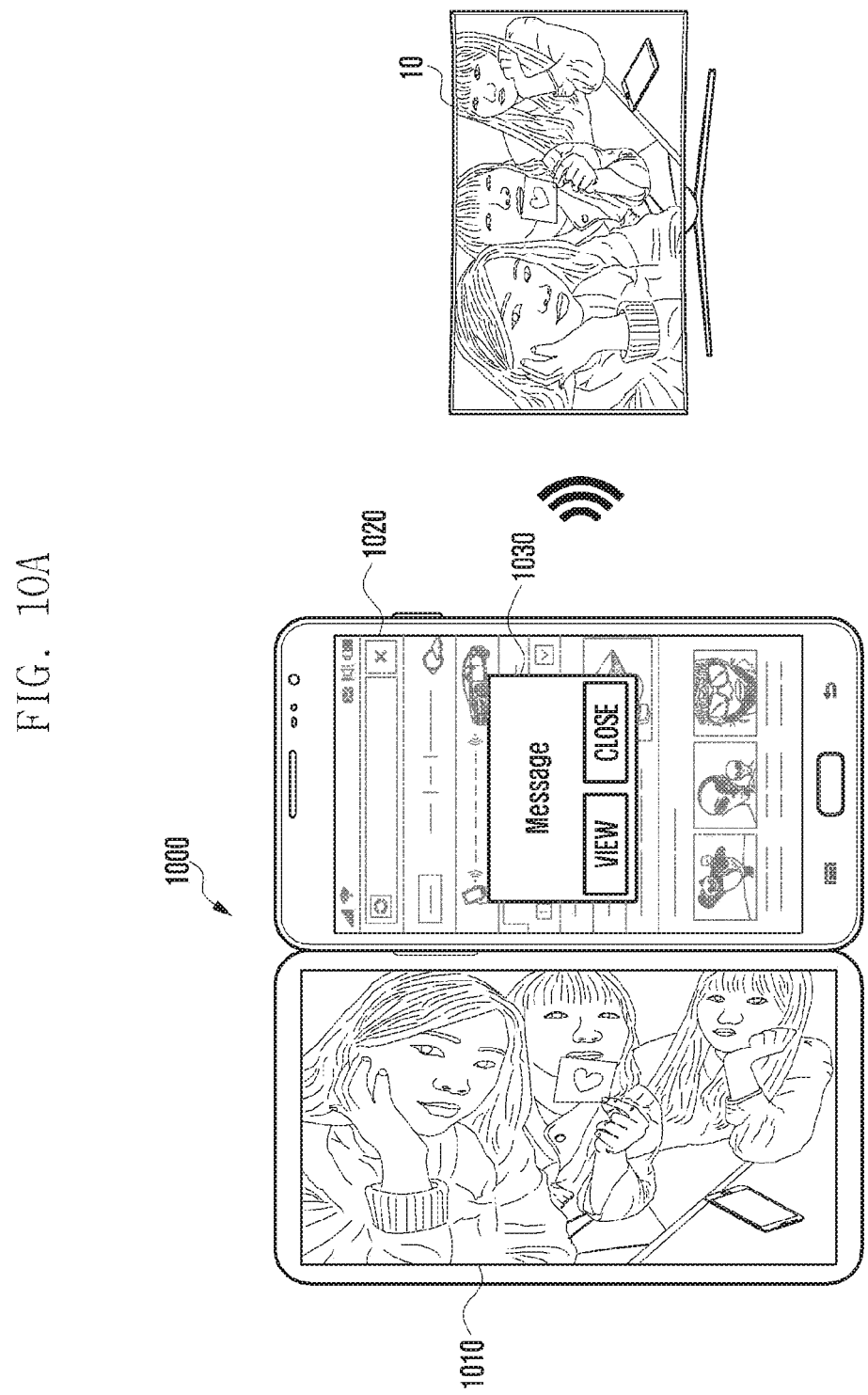
Figure 10B:
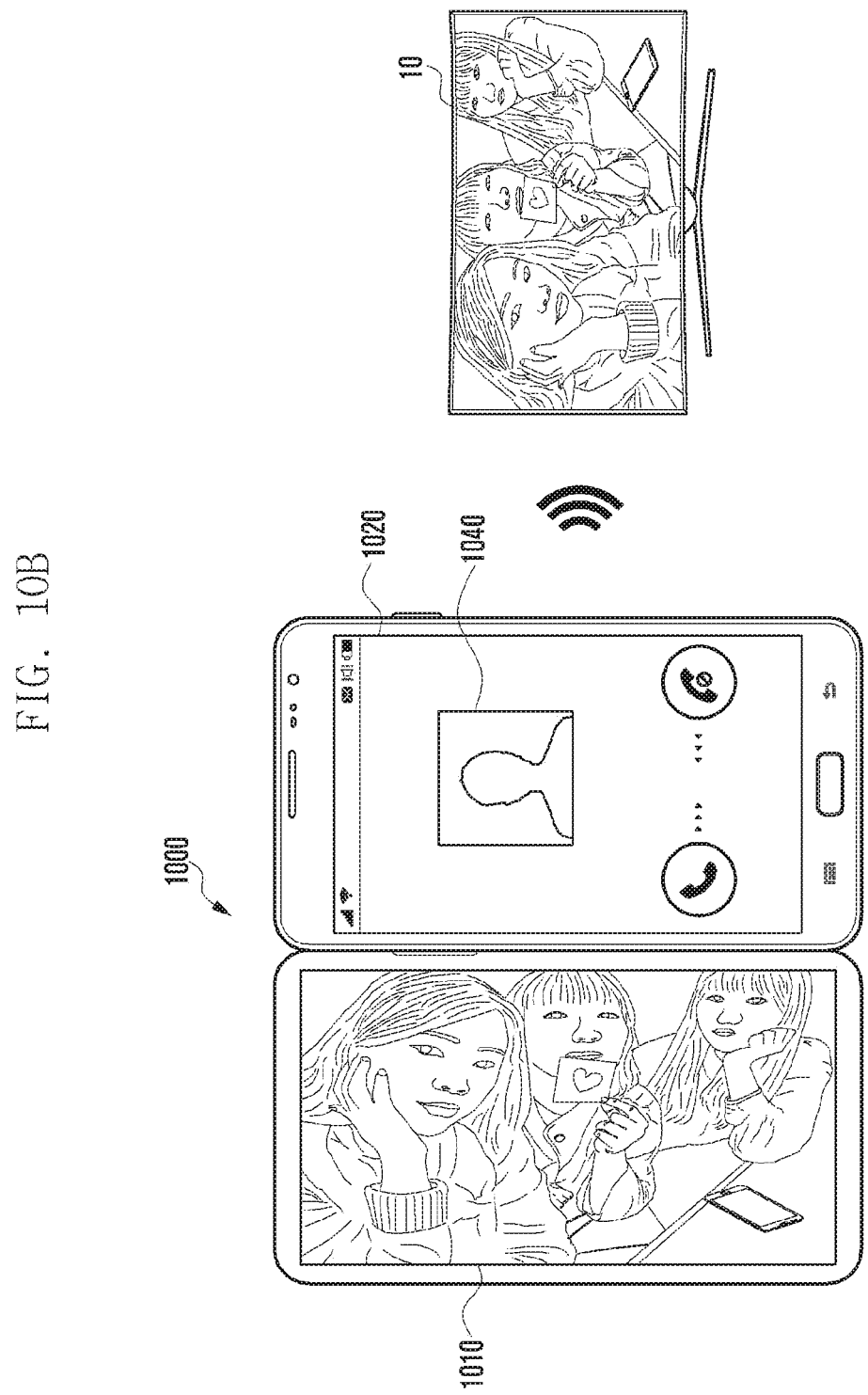

FIGS. 10A, 10B, and 10C illustrate operations for handling various events occurring while image sharing is in progress according to various embodiments of the present disclosure.

In the case of related art, when a popup window is displayed in response to occurrence of an event (e.g. SNS message, push message of an application, or system notification) while the image sharing function is being executed, the popup window is directly output not only on the display of the electronic device 1000 but also on the display of the external device 10.

In various embodiments, as shown in FIG. 10A, when an event occurs, the electronic device 1000 may output a popup window 1030 corresponding to the event on the second display 1020 as a higher layer above the second image not being shared. When a popup event occurs, the control circuit (e.g. at least one processor 120 of FIG. 1 or control circuit 540 of FIG. 5) may generate a layer for popup window 1030 and provide the layer to the second interface. At this time, the popup window is not displayed on the first display 1010 or on the display of the external device 10, but the first image can be continuously displayed thereon.

In various embodiments, as shown in FIG. 10B, when a call is received, the electronic device 1000 may display a call handling window 1040 on the second display 1020. At this time, the first image may still be output on the first display 1010 and the display of the external device 10. When the first image is generated by playback of video content, playback may be paused or the external device 10 may pause output of the first audio data.

In various embodiments, as shown in FIG. 10C, to display a menu 1050 for controlling the first image shared with the external device 10 (e.g. playback duration change, size or resolution adjustment, or volume adjustment), the menu 1050 may be output not on the first display 1010 but on the second display 1020. Hence, the first image is continuously displayed on the first display 1010 and the external device 10, and the user may control the first image by use of the menu 1050 output on the second display 1020.

Figure 11:
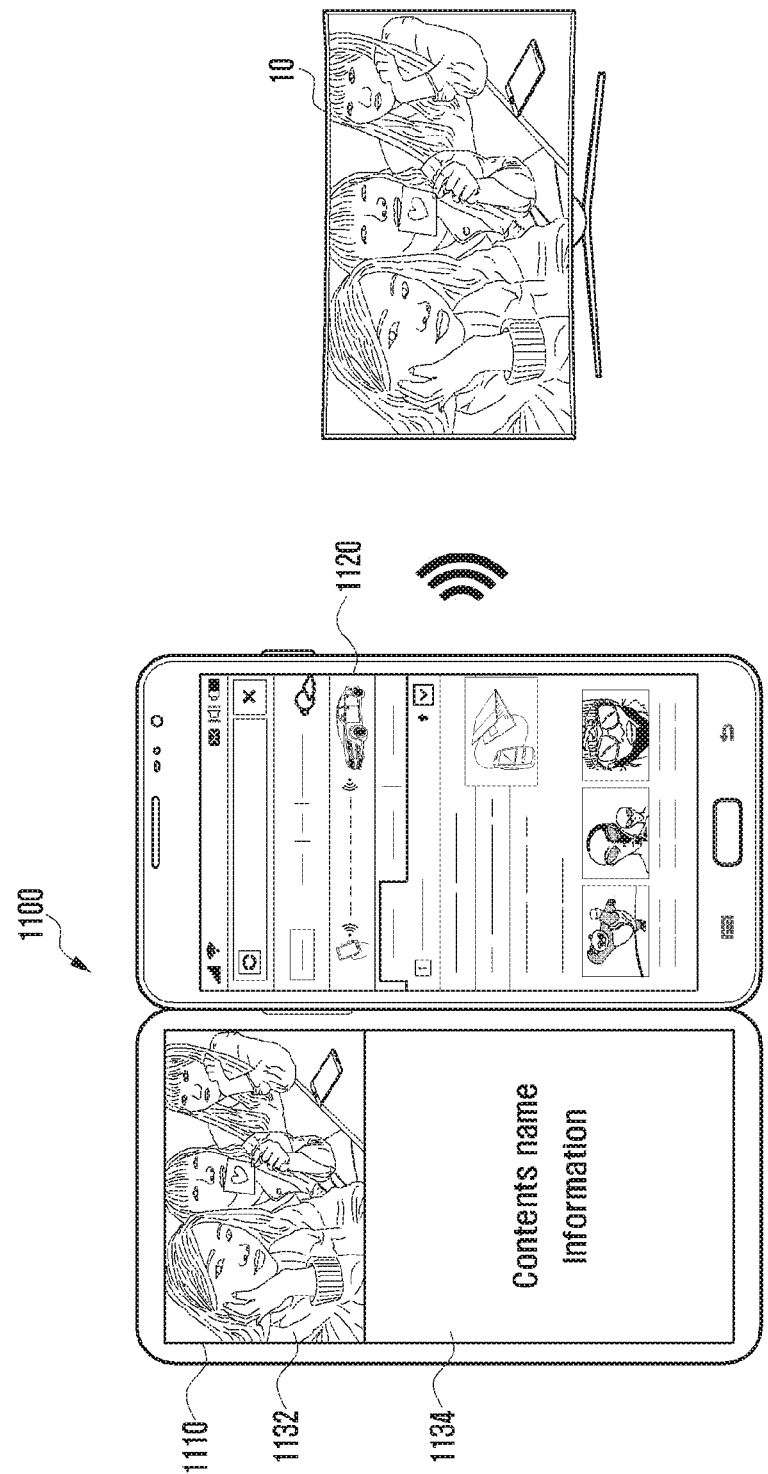
FIG. 11 illustrate changes in the display size and orientation of the external device according to various embodiments of the present disclosure.

FIG. 11 illustrate changes in the display size and orientation of the external device 10 according to various embodiments of the present disclosure.

The size and/or orientation of the images displayed respectively on the first display 1110 and the second display 1120 may be changed horizontally or vertically according to the orientation of the electronic device 1100. For example, when the first display 1110 of the electronic device 1100 is in portrait orientation, the first image may be displayed in a region 1132 of the first display 1110 and other information related to the first image may be displayed in the remaining region 1134 of the first display 1110.

In an embodiment of the present disclosure, when the electronic device 1100 shares a screen image with the external device 10, the size and/or orientation of the image output on the display 1110 or 1120 of the electronic device 1100 may be different from that of the image output on the display of the external device 10. For example, when the image sharing function is initiated for the external device 10 while the first image of portrait orientation is output on the first display 1110 of the electronic device 1100, the control circuit (e.g. control circuit or at least one processor 120 shown in FIG. 1) may send sharing data of landscape orientation to the external device 10 in consideration of configuration information (e.g. screen size and resolution) of the external device 10.

Figure 12:
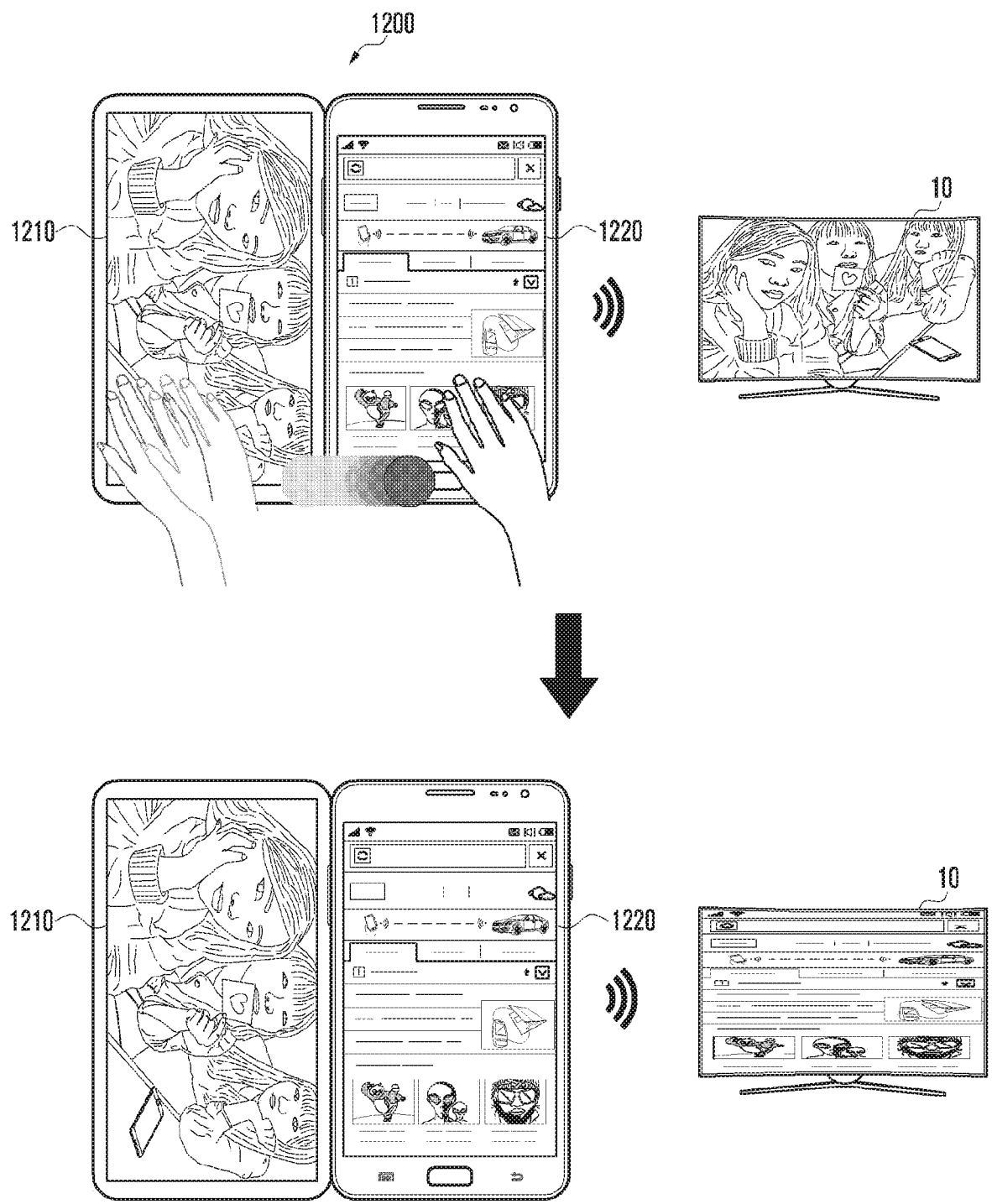
FIG. 12 illustrates shared image switching according to various embodiments of the present disclosure.

FIG. 12 illustrates shared image switching according to various embodiments of the present disclosure.

When a specified input (e.g. gesture or swipe) is detected on one of the first display 1210 and the second display 1220 while one of the first image and the second image is being shared between the electronic device 1200 and the external device 10, the communication circuit (e.g. communication circuit 550 of FIG. 5) of the electronic device 1200 may send data associated with the other of the first image and the second image to the external device 10.

Upon detection of a specified input (e.g. gesture of moving a finger from the upper end of the first display 1210 to the upper end of the second display 1220) while the first image is being shared, the control circuit may stop sending sharing data associated with the first image to the external device 10 and send sharing data associated with the second image to the external device 10.

Figure 13:
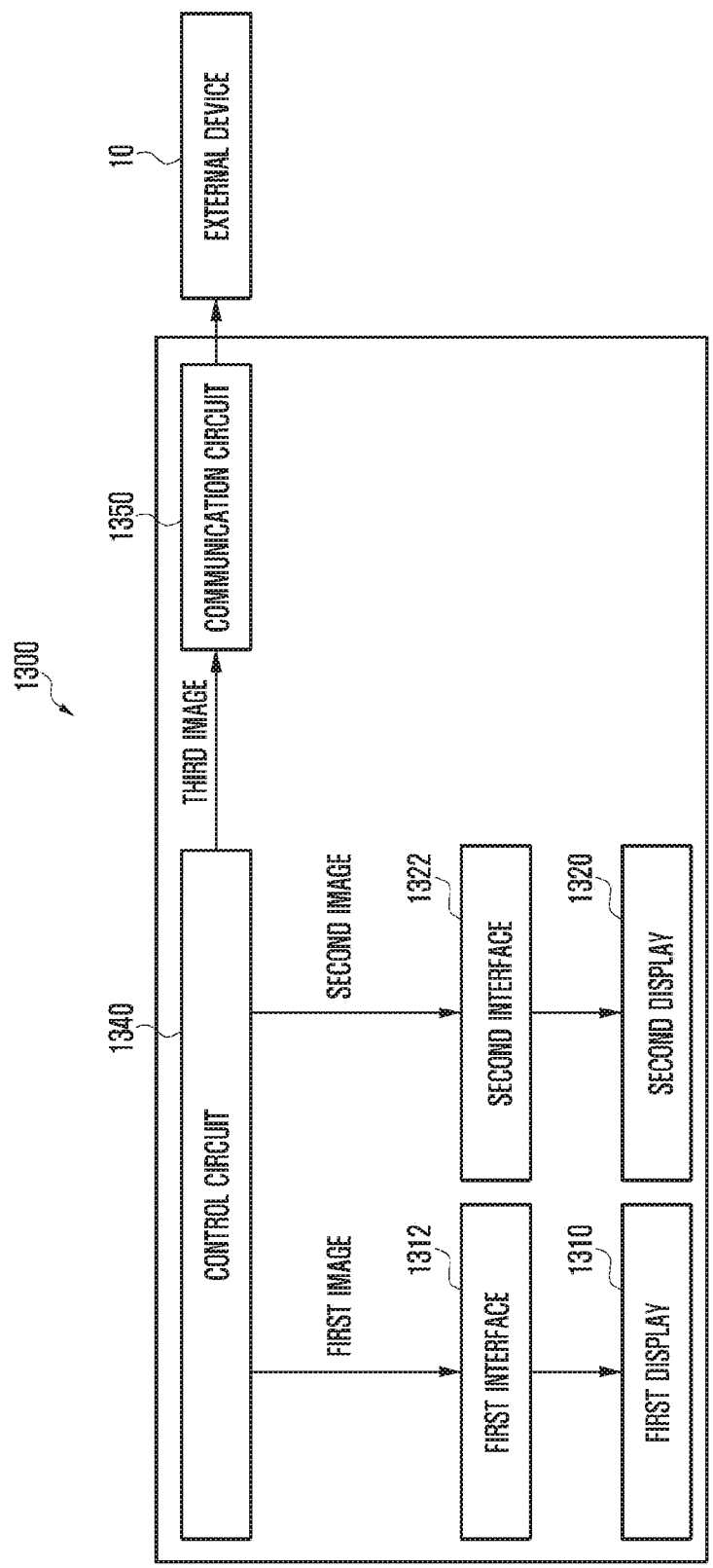
FIG. 13 is a block diagram of an electronic device according to an embodiment of the present disclosure.

FIG. 13 is a block diagram of an electronic device 1300 according to another embodiment of the present disclosure.

FIG. 13 depicts an embodiment of the present disclosure where three images generated by the electronic device 1300 are displayed respectively on the first display 1310 of the external device 10, the second display 1320 thereof, and the display of the external device 10. Technical specifics inferable from the description given in connection with FIGS. 1 to 12 are not described herein.

In an embodiment of the present disclosure, the electronic device 1300 may include a first display 1310, a second display 1320, a first interface 1312, a second interface 1322, a control circuit 1340 (e.g. at least one processor), and a communication circuit 1350 (e.g. a transceiver).

The first display 1310 may be placed on a first portion of the housing, and the second display 1320 may be placed on a second portion of the housing in separation from the first display 1310.

The control circuit 1340 may supply a first image to the first display 1310 and supply a second image to the second display 1320. The first image from the control circuit 1340 may be supplied to the first display 1310 through the first interface 1312, and the second image may be supplied to the second display 1320 through the second interface 1322 along a path independent of the first image.

In addition, the control circuit 1340 may send a third image different from the first image or second image to the external device 10 through the communication circuit 1350. Accordingly, the first image, the second image, and the third image may be displayed at least partially in parallel on the first display 1310 of the external device 10, the second display 1320 thereof, and the display of the external device 10, respectively.

For example, in the case of a video lecture, lecturing contents may be output through the external device 10 as the third image, textbook contents may be output on the first display 1310 of the electronic device 1300 as the first image, and a memo pad may be output on the second display 1320 as the second image.

Figure 14:
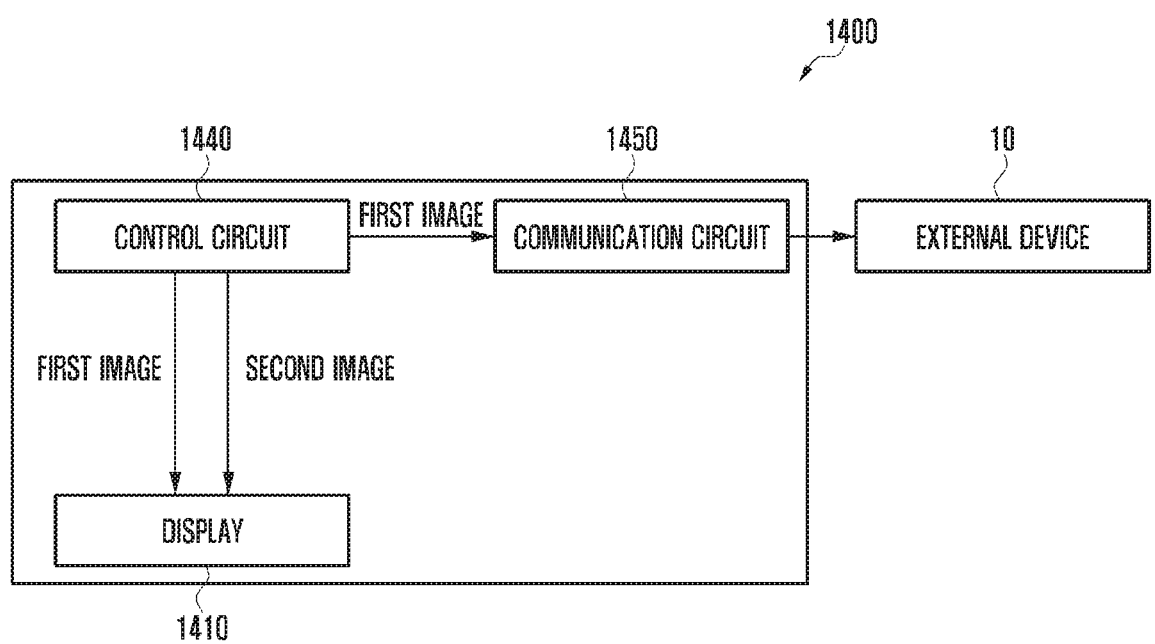
FIG. 14 is a block diagram of an electronic device according to an embodiment of the present disclosure.

FIG. 14 is a block diagram of an electronic device 1400 according to another embodiment of the present disclosure. FIG. 13 depicts an embodiment of the present disclosure where two images generated by the electronic device 1400 are displayed in demarcated areas of the display 1410 of the electronic device 1400 and on the display of the external device 10. Technical specifics inferable from the description given in connection with FIGS. 1 to 12 are not described herein.

The control circuit 1440 (e.g. at least one processor) may supply a first image to a first area of the display 1410 and supply a second image to a second area of the display 1410 at least partially different from the first area. For example, the whole area of the display 1410 may be divided into the first area and the second area, and the second image may be displayed as a part of the first image by use of a picture-in-picture (PIP) feature.

When the image sharing function is initiated, the control circuit 1440 may output the first image to the first area of the display 1410 and output the second image to the second area of the display 1410. At least partially in parallel with output of the first image and second image, the control circuit 1440 may control the communication circuit 1450 (e.g. a transceiver) to send data associated one of the first image and the second image selected by the user to the external device 10.

Figure 15:
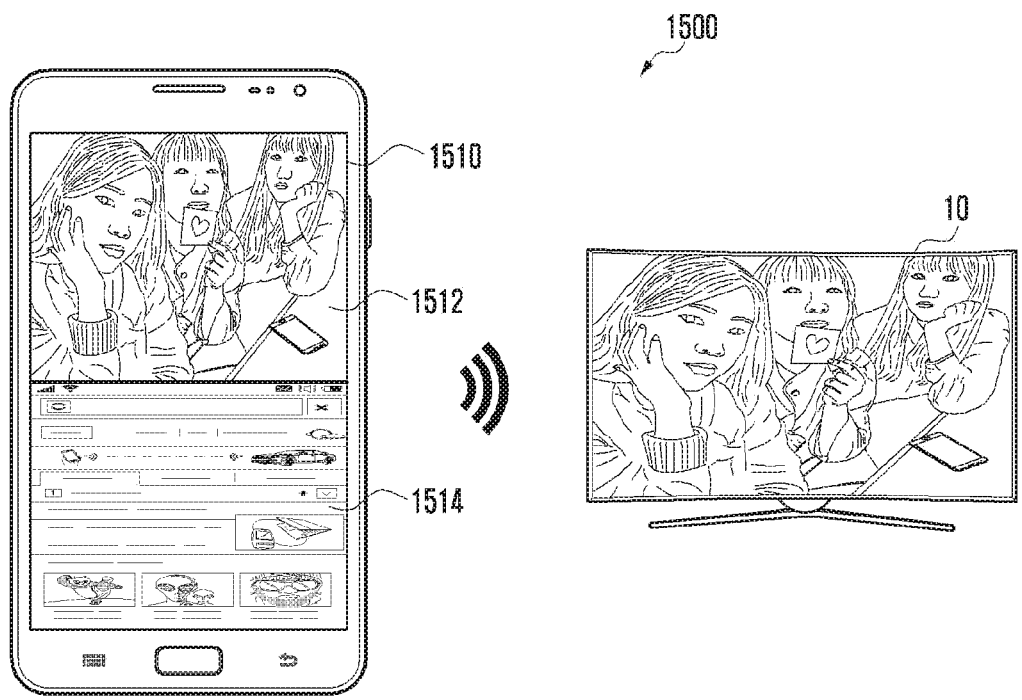
FIG. 15 illustrates adjustment of the shared screen on the basis of attributes of the external device according to various embodiments of the present disclosure.

FIG. 15 illustrates adjustment of the shared screen on the basis of attributes of the external device.

Referring to FIG. 15, when the electronic device 1500 is placed in the vertical direction, a first image may be displayed in a first area 1512 located in the upper portion of the display 1510 and a second image may be displayed in a second area 1514 located in the lower portion of the display 1510. At the same time, as the electronic device 1500 sends sharing data, the first image may be displayed on the display of the external device 10.

In an embodiment of the present disclosure, when a specified input (e.g. long press on a portion of the first area, or gesture involving touch and movement on the first area) is detected on the first area 1512 or the second area 1514, the electronic device 1500 may output a preset menu in a region of the display 1510. Here, the menu may contain an icon associated with the image sharing function, and the electronic device 1500 may send the first image or the second image to the external device 10 according to an input on the menu.

According to various embodiments of the present disclosure, an electronic device may include a housing, a first display positioned on a first portion of the housing; a second display positioned on a second portion of the housing in separation from the first display, a communication circuit positioned inside the housing, a control circuit positioned inside the housing and electrically connected to the first display, the second display, and the communication circuit, and a memory positioned inside the housing and electrically connected to the control circuit, wherein the memory may store instructions that, when executed, cause the control circuit to provide a first screen image to the first display, provide a second screen image to the second display at least partially simultaneously with displaying the first screen image on the first display, provide data associated with one of the first screen image and the second screen image to the communication circuit, and cause the communication circuit to transmit the data to an external device having a display such that a screen image at least partially identical to one of the first screen image and the second screen image is output on the display of the external device.

In an embodiment of the present disclosure, the second portion of the housing is foldable or bendable from the first portion of the housing.

In an embodiment of the present disclosure, the second portion of the housing may be positioned in the opposite direction to the first portion of the housing.

In an embodiment of the present disclosure, the electronic device may further include a first interface to provide the first screen image to the first display; and a second interface to provide the second screen image to the second display independently of the first screen image.

In an embodiment of the present disclosure, the electronic device may further include an audio processing circuit positioned inside the housing and electrically connected to the control circuit. The control circuit may control the communication circuit to send the external device data associated with one of a first audio corresponding to the first screen image and a second audio corresponding to the second screen image, and may provide the other of the first audio and the second audio to the audio processing circuit.

In an embodiment of the present disclosure, the communication circuit may be configured to send and receive data through at least two frequency bands. The control circuit may control the communication circuit to send data associated with one of the first screen image and the second screen image to the external device through one of the at least two frequency bands, and receive data associated with the other of the first screen image and the second screen image through the other of the at least two frequency bands.

In an embodiment of the present disclosure, when a specified input is detected on the first display or the second display, the control circuit may output a menu for an image sharing function on the display where the input is detected.

In an embodiment of the present disclosure, when the image sharing function is initiated through the menu, the control circuit may control the communication circuit to send the external device data associated with one of the first screen image and the second screen image corresponding to the display where the input is detected.

In an embodiment of the present disclosure, to display a popup window for a specific event, the control circuit may control one of the first display and the second display corresponding to the other of the first screen image and the second screen image associated with the data destined for the external device to display the popup window.

In an embodiment of the present disclosure, to display a menu for controlling one of the first screen image and the second screen image associated with the data destined for the external device, the control circuit may control one of the first display and the second display corresponding to the other of the first screen image and the second screen image to display the menu.

In an embodiment of the present disclosure, when a specified input is detected on one of the first display and the second display, the control circuit may control the communication circuit to stop sending data associated with one of the first screen image and the second screen image to the external device and to send data associated with the other of the first screen image and the second screen image to the external device.

According to various embodiments of the present disclosure, an electronic device may include a housing; a first display positioned on a first portion of the housing, a second display positioned on a second portion of the housing in separation from the first display, a communication circuit positioned inside the housing, a control circuit positioned inside the housing and electrically connected to the first display, the second display, and the communication circuit, and a memory positioned inside the housing and electrically connected to the control circuit, wherein the memory may store instructions that, when executed, cause the control circuit to provide a first screen image to the first display, provide a second screen image to the second display at least partially simultaneously with displaying the first screen image, provide data associated with a third screen image to the communication circuit at least partially simultaneously with displaying the first screen image and the second screen image, and cause the communication circuit to transmit the data to an external device having a display such that the third screen image is output on the display of the external device.

According to various embodiments of the present disclosure, an electronic device may include a housing, a display positioned inside the housing, a communication circuit positioned inside the housing, a control circuit positioned inside the housing and electrically connected to the display and the communication circuit, and a memory positioned inside the housing and electrically connected to the control circuit, wherein the memory may store instructions that, when executed, cause the control circuit to provide a first screen image to a first area of the display, provide a second screen image to a second area of the display at least partially different from the first area at least partially simultaneously with displaying the first screen image, provide data associated with one of the first screen image and the second screen image to the communication circuit at least partially simultaneously with displaying the first screen image and the second screen image, and cause the communication circuit to transmit the data to an external device having a display such that a screen image at least partially identical to one of the first screen image and the second screen image is output on the display of the external device.

Figure 16:
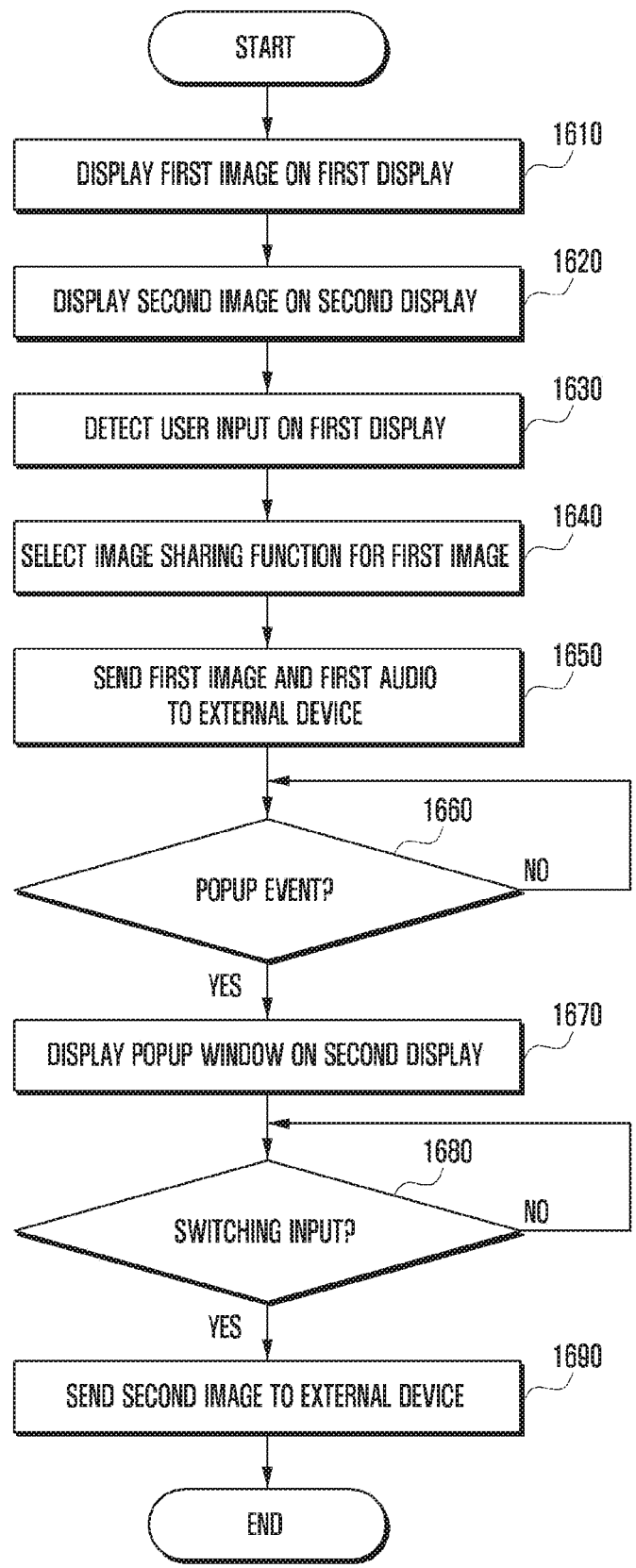
FIG. 16 is a flowchart depicting a method of image display and transmission for the electronic device according to various embodiments of the present disclosure.

FIG. 16 is a flowchart depicting a method of image display and transmission for the electronic device according to various embodiments of the present disclosure.

Referring to FIG. 16 may be executed by the electronic device described in connection with FIGS. 1 to 15. A description on the technical specifics described before is omitted herein. Although the following description focuses on the case where the first image output on the first display is displayed on the external device, it is also possible to display the second image, which is being output on the first display, on the external device.

At operation 1610, the electronic device displays a first image on the first display positioned on a first portion of the housing.

At operation 1620, the electronic device displays a second image on the second display positioned on a second portion of the housing at least partially simultaneously with displaying the first screen image. In an embodiment of the present disclosure, the second display may be physically separated from the first display.

At operation 1630, the electronic device detects a preset input on the first display. For example, the electronic device may detect a long press on a portion of the first display or a gesture involving touching a portion of the first display and moving to another portion. Upon detection of the input, the electronic device may display a menu on the first display where the input is detected. Here, the menu may contain various icons and text strings mapped with different functions.

At operation 1640, the electronic device detects selection of an icon mapped with the image sharing function from the menu. Thereafter, the electronic device may activate the image sharing function and the communication circuit may establish a communication channel to the external device.

At operation 1650, the electronic device sends data associated with the first image to the external device. The external device may display the first image on the display thereof on the basis of the received data. At this time, the first image and the second image may be continuously displayed on the first display and the second display, respectively. In an embodiment of the present disclosure, the electronic device may send the external device data associated with a third image different from the first image or the second image. In this case, the third image may be output on the display of the external device at least partially simultaneously with displaying the first image and the second image.

In addition, the first audio data corresponding to the first image may be sent to the external device and output by the external device, and the second audio data corresponding to the second image may be output through the speaker or earphone of the electronic device.

At operation 1660, the electronic device may detect a popup event like reception of an SNS message, reception of a push message for an application, or reception of a system notification.

At operation 1670, the electronic device displays a popup window corresponding to the detected popup event on the second display. In an embodiment of the present disclosure, the popup window may be displayed on the first display as a higher layer above the first image or may be displayed in the remaining area of the first display after reducing the size of the first image.

At operation 1680, the electronic device may detect a preset input for shared image switching.

Upon detection of an image switching input, at operation 1690, the electronic device stops sending sharing data associated with the first image to the external device and sends sharing data associated with the second image to the external device.

According to various embodiments of the present disclosure, a method of image display and transmission for an electronic device may include displaying a first screen image on the first display; displaying a second screen image on the second display positioned separately from the first display at least partially simultaneously with display of the first screen image; and transmitting data associated with one of the first screen image and the second screen image to an external device having a display such that a screen image at least partially identical to one of the first screen image and the second screen image is output on the display of the external device.

In an embodiment of the present disclosure, the method may further include transmitting the external device one of first audio data corresponding to the first screen image and second audio data corresponding to the second screen image; and outputting the other of the first audio data and the second audio data.

In an embodiment of the present disclosure, the method may further include displaying, upon detection of a preset input on the first display or the second display, a menu for the image sharing function on the display where the input is detected.

In an embodiment of the present disclosure, the method may further include transmitting, when the image sharing function is initiated through the menu, the external device data associated with one of the first screen image and the second screen image corresponding to the display where the input is detected.

In an embodiment of the present disclosure, the method may further include causing, to display a popup window for a specific event, one of the first display and the second display corresponding to the other of the first screen image and the second screen image associated with the data destined for the external device to display the popup window.

In an embodiment of the present disclosure, the method may further include causing, to display a menu for controlling one of the first screen image and the second screen image associated with the data destined for the external device, one of the first display and the second display corresponding to the other of the first screen image and the second screen image to display the menu.

In an embodiment of the present disclosure, the method may further include stopping, when a specified input is detected on one of the first display and the second display, sending data associated with one of the first screen image and the second screen image to the external device, and sending data associated with the other of the first screen image and the second screen image to the external device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a first display positioned on a first portion of the housing;
a second display positioned on a second portion of the housing, the second display separated from the first display;
a transceiver positioned inside the housing;
at least one processor positioned inside the housing and electrically connected to the first display, the second display, and the transceiver; and
a memory positioned inside the housing and electrically connected to the at least one processor,
wherein the memory stores instructions that, when executed by the at least one processor, cause the at least one processor to:
display a first screen image on the first display,
display a second screen image on the second display simultaneously with the displaying of the first screen image on the first display,
select one of the first screen image being displayed on the first display and the second screen image being displayed on the second display in response to a user input, while an image sharing function is activated,
provide image data associated with the selected one of the first screen image and the second screen image to the transceiver,
control the transceiver to transmit the image data to an external device having a display to display a screen image including the selected one of the first screen image and the second screen image on the display of the external device, simultaneously with the displaying of the first screen image on the first display and the second screen image on the second display, and
control one of the first display and the second display corresponding to unselected one of the first screen image and the second screen image to display a popup window for a specific event, and
wherein the first screen image is provided to the first display through a first interface and the second screen image is provided to the second display through a second interface independently of the first screen image.

2. The electronic device of claim 1, wherein the second portion of the housing is foldable or bendable from the first portion of the housing.

3. The electronic device of claim 1, wherein the second portion of the housing is positioned in an opposite direction to a direction of the first portion of the housing.

4. The electronic device of claim 1, further comprising:
an audio processor positioned inside the housing and configured to electrically connect to the at least one processor,
wherein the memory further stores instructions that, when executed by the at least one processor cause the at least one processor to control the transceiver to:
send, to the external device, a selected one of first audio data associated with a first audio corresponding to the first screen image and second audio data associated with a second audio corresponding to the second screen image, and
send the unselected of the first audio data and the second audio data to the audio processor.

5. The electronic device of claim 1,
wherein the transceiver is configured to send and receive data signals through at least two frequency bands, and
wherein the memory further stores instructions that, when executed by the at least one processor cause the at least one processor to control the transceiver to:
send, to the external device, a selected one of first data associated with the first screen image and second data associated with the second screen image through a selected one of the at least two frequency bands, and
receive the unselected of the first data and the second data through the unselected one of the at least two frequency bands.

6. The electronic device of claim 1, wherein the memory further stores instructions that, when executed by the at least one processor cause the at least one processor to, when a specified input is detected on one of the first display or the second display, control the display where the specified input is detected to output a menu for an image sharing function.

7. The electronic device of claim 6, wherein the memory further stores instructions that, when executed by the at least one processor cause the at least one processor to, when the image sharing function is initiated through the menu, control the transceiver to send, to the external device, the image data associated with a selected one of the first screen image and the second screen image corresponding to the display where the specified input is detected.

8. The electronic device of claim 7, wherein the memory further stores instructions that, when executed by the at least one processor cause the at least one processor to control one of the first display and the second display corresponding to the unselected one of the first screen image and the second screen image to display a menu for controlling one of the first screen image and the second screen image associated with the image data destined for the external device.

9. The electronic device of claim 7, wherein the memory further stores instructions that, when executed by the at least one processor cause the at least one processor to, when a specified input is detected on one of the first display and the second display:
   control the transceiver to stop sending image data associated with a selected one of the first screen image and the second screen image to the external device, and
   send image data associated with the unselected one of the first screen image and the second screen image to the external device.

10. A method of image display and transmission for an electronic device, the method comprising:
   displaying a first screen image on a first display, the first screen image provided to the first display through a first interface;
   displaying a second screen image on a second display simultaneously with the displaying of the first screen image, the second screen image provided to the second display through a second interface independently of the first screen image;
   selecting one of the first screen image being displayed on the first display and the second screen image being displayed on the second display in response to a user input, while an image sharing function is activated;
   transmitting image data associated with the selected one of the first screen image and the second screen image to an external device having a display to display a screen image including the selected one of the first screen image and the second screen image on the display of the external device simultaneously with the displaying of the first screen image on the first display and the second screen image on the second display; and
   displaying a popup window for a specific event on one of the first display and the second display corresponding to unselected one of the first screen image and the second screen image,
   wherein the second display is separated from the first display.

11. The method of claim 10, further comprising:
   transmitting to the external device a selected one of first audio data corresponding to the first screen image and second audio data corresponding to the second screen image; and
   outputting the unselected one of the first audio data and the second audio data.

12. The method of claim 10, further comprising:
   displaying, upon detection of a preset input on one of the first display or the second display, a menu for an image sharing function on the display where the input is detected.

13. The method of claim 12, further comprising:
   transmitting, when the image sharing function is initiated through the menu, the external device the image data associated with one of the first screen image and the second screen image corresponding to the display where the preset input is detected.

14. The method of claim 13, further comprising:
   displaying a menu for controlling one of the first screen image and the second screen image associated with the transmitted image data, and
   controlling one of the first display and the second display corresponding to the unselected one of the first screen image and the second screen image to display the menu.

15. The method of claim 13, further comprising:
   stopping, when a specified input is detected on one of the first display and the second display, sending image data associated with a selected one of the first screen image and the second screen image to the external device; and
   sending image data associated with the unselected one of the first screen image and the second screen image to the external device.

* * * * *